United States Patent [19]
Kimura et al.

[11] Patent Number: 6,163,012
[45] Date of Patent: Dec. 19, 2000

[54] LASER MAINTAINING AND REPAIRING APPARATUS

[75] Inventors: Motohiko Kimura, Yokohama; Akira Sudo, Yokosuka; Katsuhiko Sato, Machida; Yuji Sano, Yokosuka; Masaki Yoda, Yokohama; Naruhiko Mukai, Yokohama; Seishi Shima, Yokohama; Muneyoshi Kikunaga, Yokohama, all of Japan

[73] Assignees: Kabushiki Kaisha Toshiba; Toshiba Engineering Corporation, both of Kawasaki, Japan

[21] Appl. No.: 08/937,663

[22] Filed: Sep. 24, 1997

[30] Foreign Application Priority Data

Sep. 27, 1996 [JP] Japan .................................. 8-256532

[51] Int. Cl.$^7$ .................................................. B23K 26/00
[52] U.S. Cl. .............................. 219/121.78; 219/121.63
[58] Field of Search ......................... 219/121.63, 121.64, 219/121.78, 121.79

[56] References Cited

U.S. PATENT DOCUMENTS

| | | |
|---|---|---|
| 4,724,298 | 2/1988 | Hawkins et al. .................... 219/121.78 |
| 4,855,564 | 8/1989 | Hawkins et al. .................... 219/121.78 |
| 4,926,194 | 5/1990 | Herrmann . | |
| 5,034,618 | 7/1991 | Akeel et al. ......................... 356/152.1 |
| 5,938,954 | 8/1999 | Onuma et al. ...................... 219/121.84 |

FOREIGN PATENT DOCUMENTS 0 345 469  12/1989  European Pat. Off. .

| | | |
|---|---|---|
| 58-149002 | 9/1983 | Japan . |
| 6-269975 | 9/1994 | Japan . |
| 7-1171 | 1/1995 | Japan . |
| 7-181282 | 7/1995 | Japan . |
| 7-248397 | 9/1995 | Japan . |
| 8-104949 | 4/1996 | Japan . |

OTHER PUBLICATIONS

Patent Abstracts of Japan, vol. 018, No. 679 (M–1728), Dec. 21, 1994, JP 06–269975, Sep. 27, 1994.

Patent Abstracts of Japan, JP 07–001171, Jan. 6, 1995.

*Primary Examiner*—Geoffrey S. Evans
*Attorney, Agent, or Firm*—Oblon, Spivak, McClelland, Maier & Neustadt, P.C.

[57] ABSTRACT

A laser maintaining and repairing apparatus including a laser oscillator 7, beam guiding apparatus 8 connected to guide a laser beam of the laser oscillator 7, and emitting head 12 for converging the laser beam from the beam guiding apparatus 8 and emitting the beam to a portion to be processed. The beam guiding apparatus 8 includes liquid-tight tubular beam guiding members 9a to 9h. The beam guiding members 9a to 9h are provided with reflecting members 13a, 13b and at least one of mechanisms 10a, 10b and 11a, 11b for providing horizontal turning, horizontal extending, vertical turning and vertical extending operations at the beam guiding members 9a to 9h. With the laser maintaining and repairing apparatus of the noted structure, a laser beam of high energy density can be utilized and processing by the laser beam can be facilitated or the applying range can be increased.

19 Claims, 14 Drawing Sheets

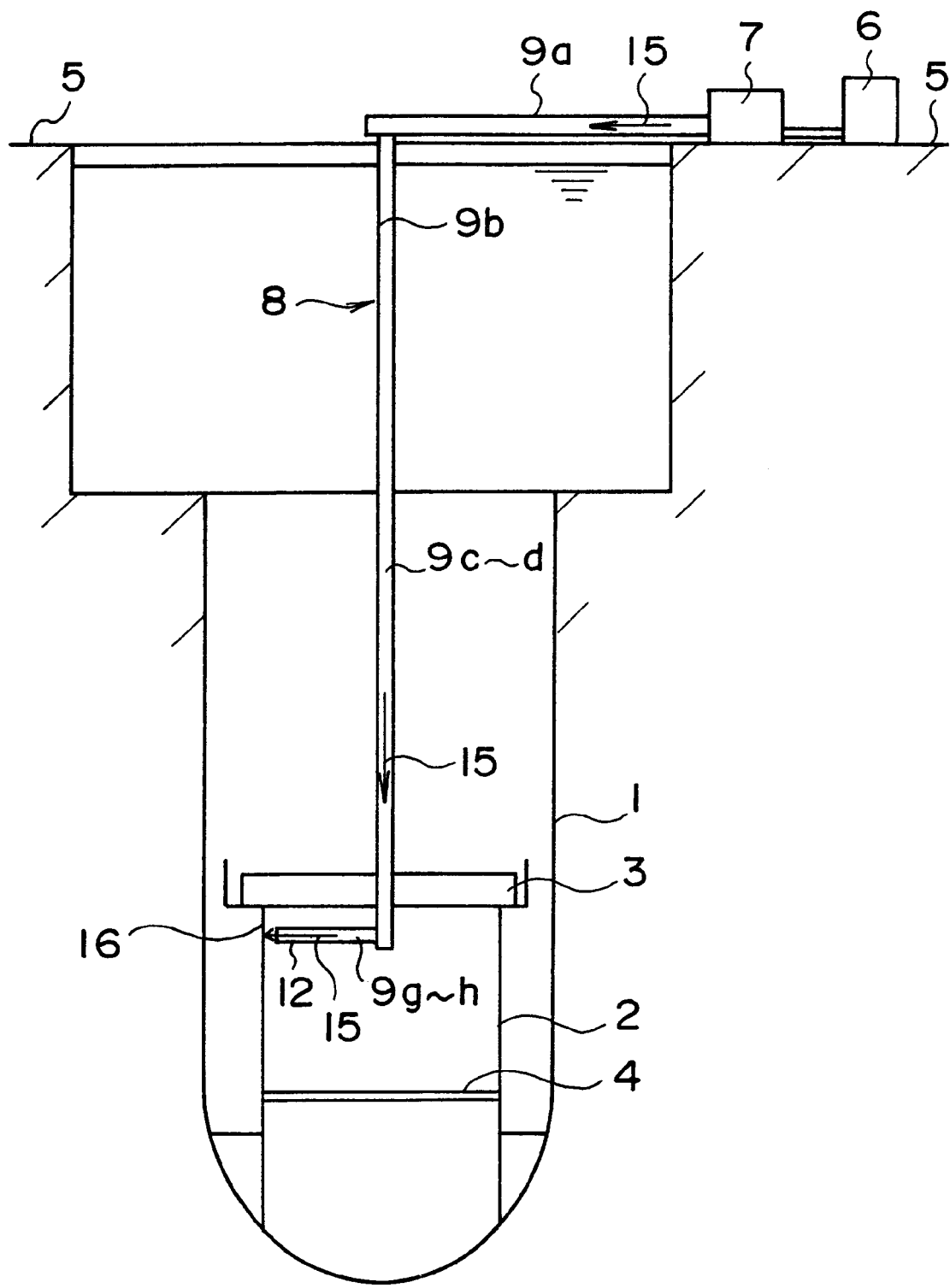
F I G. 1

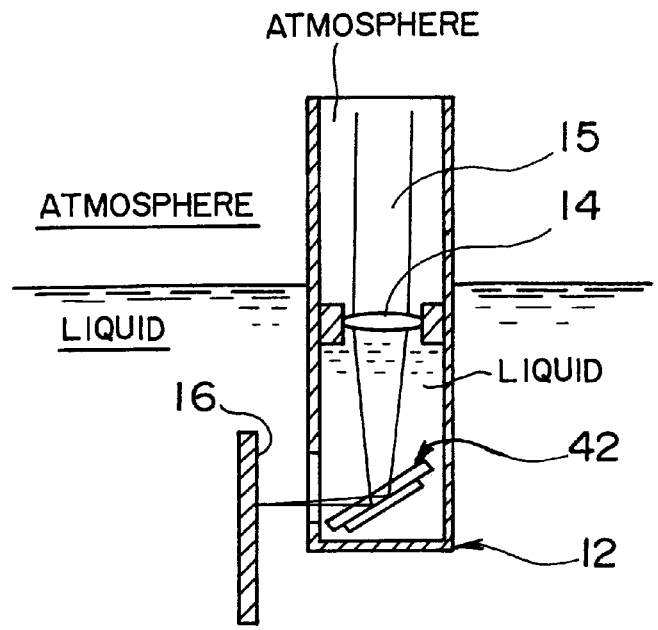
F I G. 14
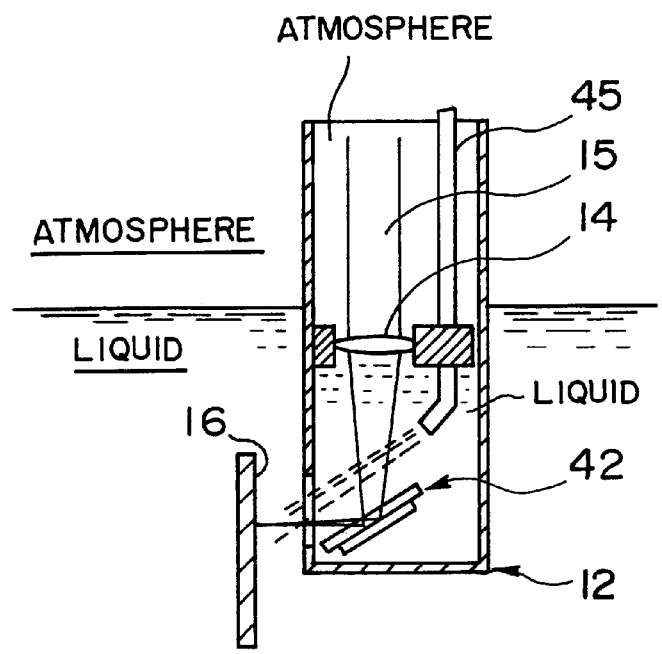
F I G. 15

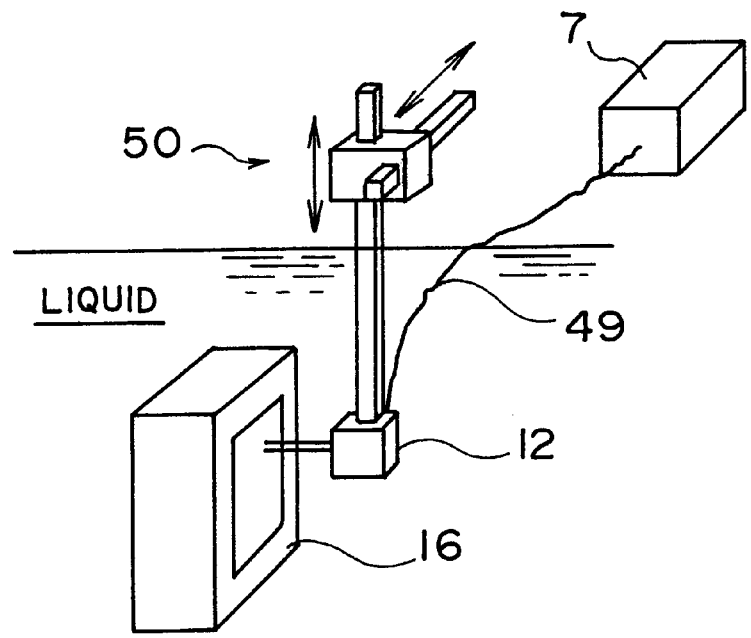
F I G. 19
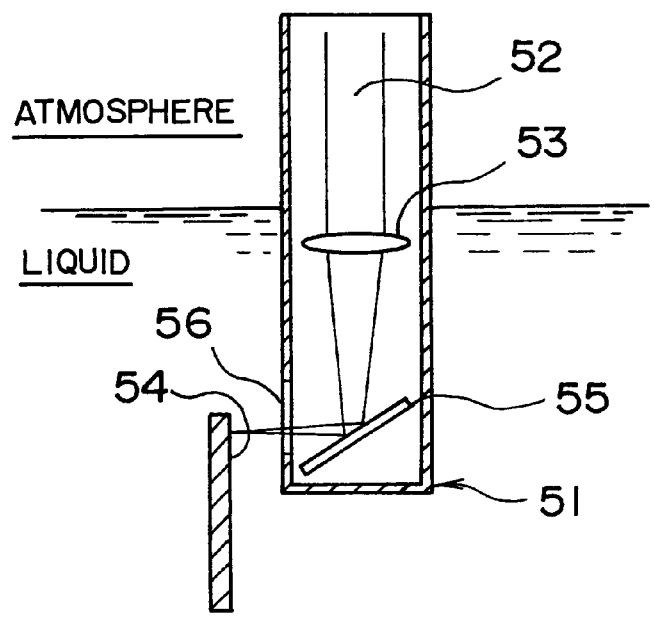
F I G. 20

LASER MAINTAINING AND REPAIRING APPARATUS

BACKGROUND OF THE INVENTION

1. Field of the Invention

The present invention relates to a laser maintaining and repairing apparatus for processing a material, improving the residual stress of the surface of a workpiece, modifying the surface of the workpiece and welding and repairing by a laser beam, and more particularly to a laser maintaining and repairing apparatus capable of efficiently emitting a laser beam of high energy density, which generates the laser beam by a laser oscillator and guides and converges the beam to the portion to be processed at a predetermined distance.

2. Prior Art

A laser beam is a coherent monochromatic light having a very short wavelength, well aligned phases and every high convergence. Accordingly, since the laser beam can be concentrated at the light energy of high density to a narrow area, it is utilized in a wide field such as a communication, a measurement, a medical treatment and metallic machining.

In the field of the metallic machining, various machining such as welding, cutting, perforating and surface modifying are conducted by utilizing the laser beam of high energy density. Since the processing using the laser beam is non-contact processing, any place can be processed if the beam can arrive at the place. And, a laser emitting head for converging to emit the laser beam to a portion to be processed can be reduced in size. Since the heat input to a material is small, it has a merit of the possibility of precise processing. The processing using the laser beam is utilized for the maintenance and repair of a nuclear pressure vessel and a structure in a nuclear reactor for a nuclear power plant by applying these merits.

For example, the structure in a boiling water reactor is formed of a material having sufficient corrosion resistance and high temperature strength in a high temperature and high pressure environment such as, for example, austenite stainless steel or nickel-based alloy. These members are exposed with severe environment for a long time by the operation of a plant for a long period, and affected by neutron radiation, and hence the problem of the material deterioration must be considered. Particularly, the vicinity of the welded portion of the structure in the reactor has a potential danger of stress corrosion cracking due to the sensitization and tensile residual stress of the material due to the welding input heat.

Recently, various material surface improving technology has been developed as preventive maintenance remedy for the safety operation of a nuclear power plant. Of them, technique for emitting a laser beam to the surface of a material to modify the surface is disclosed, for example, in Japanese Patent Publication No. 246483/1995 and 206869/1996.

The former relates to a method for emitting a laser beam from a pulse laser to the surface (to be processed) of a workpiece via a reflecting mirror to retain a compression stress at the surface to be processed by emitting the beam to the surface to be processed while altering the emitting position.

The latter relates to a method for emitting a laser beam of high power and short pulse having a visible wavelength to the surface to be processed dipped in cooling water to improve the residual stress of the surface to be processed and to remove the crack or clad.

In these methods and apparatuses, an optical fiber is used as beam guiding means for guiding a laser beam from an oscillator to the position of the surface to be processed. The optical fiber has merits of flexibility and possibility of guiding the beam to a narrow portion.

In the laser beam emitting head, the beam guided via the optical fiber is converged to an arbitrary area via a condensing optical system such as a lens, further altered at its optical path by a mirror, and emitted to an arbitrary place to be processed As described above, the conventional laser processing apparatus, in the case that the laser oscillator and the surface to be processed are located at a distance, transfers the laser beam generated from the laser oscillator via the beam guiding means such as the optical fiber, converges the laser beam by the lens and the reflecting mirror at the end of the beam guide passage (laser beam transfer route), and emits the laser beam to the portion to be processed.

FIG. 20 is a structural view of a conventional laser processing apparatus of the case that a laser oscillator and a surface to be processed are separate.

As shown in FIG. 20, an emitting head 51 of the laser processing apparatus installed in liquid has a condensing lens 53 for converging a laser beam 52 transmitted from a laser light source (laser oscillator), not shown in FIG. 20, via beam guiding means (optical fiber), a reflecting mirror 55 for reflecting the condensed beam 52 to emit the beam 52 to a portion 54 to be processed, and an optical window 56 for sealing liquid to hold the condensing lens 53 and the reflecting mirror 55 in the air (in the beam guiding means of a liquid-tight structure) to enable the work in the liquid.

The laser beam used for the processing has a high energy density. When the portion 54 to be processed and the emitting head 51 are near at hand, the laser beam become the high energy density even on the surfaces of the optical window 56 and the reflecting mirror 55. When the pulse energy of the laser beam transmitted is 200 mJ and the emitting area on the surface of the material is 1 mm$^2$, the energy density arrives at 20J/cm$^2$. In case that the portion 54 to be processed and the optical window 56 are close to one another, when the energy density is 20J/cm$^2$ on the surface of the optical window 56 and the beam diameter is 5 mm$^2$, the optical strength of 4J/cm$^2$ or more is required on the surface of the reflecting mirror 55.

However, in the conventional laser processing apparatus of the constitution described above, there is a limit to emit the laser beam of the high energy density due to the restrictions in the optical fiber for guiding the beam, and the lens and the reflecting mirror for concentrating or reflecting the laser beam. Further, there is a difficulty of processing due to the use of the optical fiber and the lens and the reflecting mirror of the above-described constitution. This will be described below.

The conventional laser processing method and apparatus as described above use the optical fiber to guide the laser beam from the oscillator to the position of the surface to be processed, but there is a limit in the power or energy capable of guiding the laser beam via the optical fiber. The material limit of the optical fiber limits the energy density of the laser beam of the conventional laser processing apparatus, and therefore limits the processing performance.

In the case for the purpose of modifying the surface of a material as described above, to obtain the optical power and energy density at the necessary surface to be processed, it is necessary to concentrate the beam emitted from the optical fiber as small as possible. However, the beam emitted from the optical fiber is substantially equivalent to the diffused beam with the core of the optical fiber as a light source, and has properties that the beam is expanded and emitted according to the NA (Numerical Aperture) number determined in accordance with the refractive index of the optical fiber constituting material. In general, the optical fiber for power laser has NA number of about 0.2. The beam emitted from the optical fiber is diffused at an angle of approximately 46 degrees (=2 $\sin^{-1}$ (0.2)).

To emit the beam from such optical fiber to the surface to be processed, it is necessary to focus the image of the core of the optical fiber by using a lens. In this case, the size of the image on the surface to be processed becomes the product of multiplying the magnifying ratio by the size of the optical fiber core. From such properties, it is necessary to reduce the magnifying ratio to converge the beam emitted from the optical fiber as small as possible.

However, if the magnifying ratio is reduced, the NA number of the converged beam emitted from the lens is increased. That is, when the magnifying ratio is M, the NA number of the optical fiber is A and the NA number of the focusing side is B, there is the relationship of M=A/B. For example, when the core of the optical fiber is the same by using the optical fiber (A=0.2), B=0.2 is obtained, and the beam is converged at an angle of 46 degrees.

In general, when the laser beam is converted such a deep angle, the focal depth becomes very shallow. Accordingly, in the case that the surface to be processed with a complicated shape is an object, an emitting optical system having an optical fiber and a lens must be precisely positioned.

The above-mentioned subject is always accompanied with the case that the beam is transmitted via the optical fiber, and it is not corresponded when the beam is transmitted via a space and the beam is converged with the lens having low NA number.

On the other hand, the emitting head for converging and reflecting the laser beam to emit the beam to the surface to be processed also has a restriction for emitting the laser beam of high energy density.

As described above, the laser beam transmitted from the laser beam source to the emitting head near the portion to be processed is converged to an arbitrary area by a converging optical system such as a lens, further altered at the optical path by a reflecting mirror, emitted to an arbitrary place to be processed, and processed, but when the laser beam of high energy density is emitted, to prevent the damage of the optical system such as a condensing lens and a reflecting mirror, it is necessary to incorporate the optical strength capable of sufficiently enduring against the power of the laser beam.

Particularly, in the case that the reflecting mirror for reflecting the laser beam after the convergence and the emitting head containing the optical system is required to be liquid-tight due to the reason of underwater processing, the optical window for externally emitting the laser beam from the interior of the emitting head must endure against the laser beam of very high energy density.

However, the reflecting film of dielectric material normally formed on the surface of a reflecting mirror has high reflectivity but expensive cost, and the optical strength is more or less deteriorated. In the case of the laser of continuous beam, the energy density of the laser beam normally does not arrive at the level of the degree that these optical components are damaged, but in the case of the laser beam of very short pulse, the peak energy might arrive at the level or higher, and it becomes the cause for limiting the energy of the laser beam capable of being used for processing.

Since the reflecting mirror is easily damaged, in the laser processing apparatus of FIG. 20, for example, the incident angle to the reflecting mirror 55 is limited to the determined angle such as 0° or 45°. Therefore, it cannot to emit the laser beam by driving the mirror to an arbitrary angle. Thus, the fine adjustment at the time of processing is limited.

Further, when the converging lens 53 and the reflecting mirror 55 are located near to each other to increase the beam diameter of the laser beam on the surface of the reflecting mirror 55, the converging lens 53 having a short focal length must be used. The problem that the beam diameter on the reflecting mirror must be increased causes that the focal length of the lens must be further shortened together with the problem that the magnifying ratio due to the above-descried optical fiber must be reduced, thereby increasingly causing the error in the emitting area on the surface of the emitting portion.

SUMMARY OF THE INVENTION

Accordingly, an object of the present invention is to provide a laser maintaining and repairing apparatus which can utilize a laser beam of high energy density and further can facilitate the laser beam processing or increase the applying range of the laser beam processing.

A laser maintaining and repairing apparatus according to the present invention includes:

a laser oscillator, beam guiding means connected to the laser oscillator to guide a laser beam , and an emitting head for converging the laser beam from the beam guiding means and emitting the laser beam to a portion to be processed, wherein said beam guiding means includes a tubular beam guiding member liquid-tightly constituted, a reflecting member is provided in the beam guiding member, and said beam guiding member includes at least one of mechanisms for imparting horizontally turning, horizontally extending or contracting, vertically turning and vertically extending or contracting operations.

According to this invention, since the laser beam is guided by the tubular beam guiding member instead of the optical fiber, the laser beam is generally passed through the atmosphere to be able to transmit the laser beam of higher energy density than that of the optical fiber.

Further, since parallel beams are easily obtained in the case that the laser beam is transmitted in space inside of the tubular beam guiding member, the requirement for reducing the magnifying ratio is alleviated, and since the focal depth can be deepened, the requirement for positioning can be moderated.

Since the beam guiding means includes the turning and extending or contracting mechanism, the emitting head is easily approached to the surface to be processed and opposed thereto. On the other hand, the laser beam of high energy density can be transmitted to the emitting head from a large-sized laser oscillator located in a separate wide place. When the laser maintaining and repairing apparatus is used for a nuclear reactor vessel, the surface to be processed in the structure in the reactor or the nuclear reactor pressure vessel including a nozzle can be executed for preventive maintenance and repairing operation such as laser peening, melting, cladding or welding.

A laser maintaining and repairing apparatus according to the present invention includes:

a laser power source installed out of a nuclear reactor pressure vessel, and a laser emitting unit installed in the nuclear reactor pressure vessel connected to the laser power source, wherein said laser emitting unit includes a laser oscillator connected to said laser power source, a liquid-tight vessel containing the laser oscillator and having a laser transmission window, beam guiding means connected to the laser transmission window of said liquid-tight vessel, and emitting head for converging the laser beam from said beam guiding mean and emitting the laser beam to a portion to be processed, and said beam guiding means includes a plurality of tubular beam guiding means of liquid-tight structure connected in tandem with said liquid-tight vessel, reflecting members are provided in these beam guiding means, and said beam guiding member includes at least one of mechanisms for imparting horizontally turning, horizontally extending or contracting, vertically turning, and vertically extending or contracting operations.

According to this invention, the distance between the laser oscillation and the surface to be processed can be shortened, and hence the transmission loss of the laser beam can be reduced. Further, the positioning accuracy can be easily enhanced, the beam guiding member required for relative positional accuracy can be shortened, and hence the operation at the time of installing is facilitated.

A laser maintaining and repairing apparatus according to the present invention includes features, according to claim 2, wherein a center post is stood on an upper core plate of an upper portion of a shroud body in the nuclear reactor pressure vessel, a turning unit is horizontally rotatably provided at the center post, a moving carriage is horizontally movably provided at the turning unit, and said laser emitting unit is provided on the moving carriage.

According to this invention, since the emitting head has three degrees of freedoms of turning, horizontally extending and elevating by the turning driver remotely driven via the center post, the turning and extending and contracting mechanism of the laser emitting unit on the upper core plate, the laser beam can be certainly emitted to the surface to be processed, thereby conducting the preventive maintenance and repairing operation such as laser peening, melting, cladding or welding of the nuclear reactor pressure vessel and the structure in the reactor.

A laser maintaining and repairing apparatus according to the present invention, includes features, according to claim 3, wherein a vertical wheel and a horizontal wheel in contact with said shroud body upper edge portion are fastened to the end of said turning unit.

According to this invention, since the turning unit can be smoothly turned and driven by the vertical wheel and the horizontal wheel running at the shroud body upper edge portion, the maintenance and repairing operation in the nuclear reactor can be facilitated.

A laser maintaining and repairing apparatus according to the present invention includes features, according to claim 2, wherein a remote driver having horizontally turning, horizontally extending and vertically elevating mechanism is provided on an upper core plate of a shroud body upper portion in said nuclear reactor pressure vessel, and said laser emitting unit is provided at said remove driver.

According to this invention, there is an operating range which can cover the entire area of the shroud body inner wall by the remote driver having the three degrees of freedoms of horizontally turning, horizontally extending and vertically elevating, the emitting head can be easily moved to the surface to be processed in the nuclear reactor pressure vessel, thereby continuously efficiently executing the series of maintaining and repairing operations such as inspection and repair.

Further, the emitting head is inserted from another lattice hole from the lattice hole of the upper core plate installed with the remote driver, and the dimensional restriction (reactor core supporting plate passing condition) of the emitting head and the remote driver can be alleviated, thereby conducting the operation in the shroud of the lower portion from the reactor core supporting plate.

A laser maintaining and repairing apparatus according to the present invention includes features, wherein the rotating mechanism for imparting said turning operation includes a bearing and an 0-ring provided on the outer surface of said beam guiding member, a rotation driving motor, and a gear provided on the outer surface of said beam guiding member engaged with a gear mounted at a rotary shaft of the motor.

According to this invention, the one beam guiding member and the other member are rotatably mounted and can be relatively rotated by the motor (actuator). The one member and the other member are stretchably mounted, and can be relatively stretchably provided by the extending or contracting mechanism (actuator). The beam guiding member is liquid-tight, and simultaneously rotatably mounted, and hence the beam guiding member can be rotated while maintaining liquid-tightly, and further the stretchably mounted beam guiding member can be extended or contracted while holding liquid-tightly with one another.

A laser maintaining and repairing apparatus according to the present invention includes features, wherein a mechanism for rotatably aligning around axes perpendicular to one another by first and second motors is provided at a reflecting member in said beam guiding member.

According to this invention, the angle of the reflecting member can be altered while centering the reflecting member by the first and second motors. Accordingly, even if a positional deviation occurs due to the deflection of the beam guiding member, it can be aligned remotely, and the execution can be finished in a short time without interrupting the operation.

A laser maintaining and repairing apparatus according to the present invention includes a laser oscillator, beam guiding means connected to the laser oscillator to guide a laser beam generated by the laser oscillator, and an emitting head for converging the laser beam from the beam guiding means and emitting the laser beam to a portion to be processed, wherein said emitting head includes an optical window provided at the end of the optical guide passage of said beam guiding means forming an element for sealing said beam guiding means and transmitting the laser beam, a converging member disposed at the inside of the beam guiding means or at the outside of the beam guiding means of said optical window for converging the laser beam, and a reflecting mirror for reflecting the laser beam converged by said converging member to emit the beam to a portion to be processed, and said reflecting mirror includes a transparent member, and a reflecting layer provided on the back surface of said transparent member and made of vacuum or predetermined fluid, and the laser beam is reflected by the total reflection of the boundary between said transparent member back surface and said reflecting layer.

According to this invention, the optical window is disposed near the converging member as the sealing member of the beam guiding member to increase the emitting area of the laser beam to the optical window. Therefore, the energy density of the laser beam for the optical window is reduced, and the energy of the laser beam which can be transferred by the beam guiding means is increased that much.

The reflecting mirror according to this invention includes the reflecting layer made of vacuum or predetermined fluid on the back surface of the mirror to reflect the laser beam by the total reflection of the boundary between the mirror back surface and the reflecting layer, and hence the limit in the optical strength of the reflecting film on the reflecting mirror surface is eliminated, thereby enabling to use the laser of the high energy density.

A laser maintaining and repairing apparatus according to the present invention includes:

a laser oscillator, beam guiding means connected to the laser oscillator to guide a laser beam generated by the laser oscillator, and an emitting head for converging the laser beam from the beam guiding means and emitting the laser beam to a portion to be processed, wherein said emitting head includes a converging member provided at the end of the optical guide passage of said beam guiding means forming an element for sealing said beam guiding means and converging the laser beam, and a reflecting mirror for reflecting the laser beam converged by said converging member and emitting the beam to a portion to be processed, and said reflecting mirror includes a transparent member, and a reflecting layer provided on the back surface of said transparent member and made of vacuum of predetermined fluid, and the laser beam is reflected by the total reflection of the boundary between said transparent member back surface and said reflecting layer.

According to this invention, since the converging member becomes also the sealing element of the beam guiding member, the optical window can be eliminated. That is, the structure can be simplified, and the limit due to the optical strength of the optical window can be completely excluded.

A laser maintaining and repairing apparatus according to the present invention includes features, wherein said emitting head includes a liquid jet nozzle for removing laser beam scatter causing substance of the portion to be processed.

According to this invention, since the liquid jet nozzle for removing laser beam scatter causing substance is provided at the emitting head, bubble or dust generated from the portion to be processed can be removed, and the laser beam can be efficiently emitted to the portion to be processed.

A laser maintaining and repairing apparatus according to the present invention includes features, wherein said emitting head includes a liquid jet nozzle for forming a liquid layer on the surface of the laser emitting portion.

According to this invention, since the liquid jet nozzle for forming a liquid layer on the surface of laser emitting portion is provided at the emitting head, similar process can be executed even in the air or liquid.

A laser maintaining and repairing apparatus according to the present invention includes features wherein said emitting head is formed integrally cylindrically with the end of said beam guiding means, and said beam guiding means includes a mechanism for imparting the rotation in the circumferential direction and extending or contracting operation in the axial direction, and is formed to enable to process the inner surface of a cylindrical workpiece.

According to this invention, the end of the beam guiding means is integrated cylindrically with the emitting head, and the end of the beam guiding means and the emitting head can be processed while rotating in the circumferentially or moving in the axial direction, and particularly the inner surface of the cylindrical workpiece can be easily processed.

A laser maintaining and repairing apparatus according to the present invention includes features, wherein the reflecting mirror of said emitting head includes a mechanism for rotatably aligning around axes perpendicular to one another by first and second motors.

According to this invention, the reflecting mirror includes the mechanism for rotatably aligning around axes perpendicular to one another by the first and second motors, and hence the incident angle of the laser beam to the reflecting mirror is driven in the angle range larger than the critical angle of the total reflection, and the laser beam can be reflected in an arbitrary direction to be processed. Thus, the portion to be processed of the wide range can be continuously processed without moving the emitting head.

A laser maintaining and repairing apparatus according to the present invention includes features, wherein said beam guiding means is made of an optical fiber, and said emitting head is supported by a supporting driver having at least one of mechanisms for imparting horizontally turning, horizontally extending or contracting, vertically turning and extending or contracting operations.

According to this invention, the emitting head is supported and driven by the supporting driver, and the beam guiding means is formed of a flexible optical fiber. Accordingly, even the optical guide passage of a complicated shape which cannot be directly observed through can easily transmit the laser beam to the portion to be processed.

BRIEF DESCRIPTION OF THE DRAWINGS

A more detailed understanding of the invention may be had from the following description of preferred embodiments thereof, given by way of example and to be read and understood in conjunction with the accompanying drawings, in which:

FIG. 1 is a longitudinal sectional view showing the entire structure and installation example of a first embodiment of a laser maintaining and repairing apparatus of the present invention;

FIG. 14 is a longitudinal sectional view showing the structure of an eighth embodiment of a laser maintaining and repairing apparatus of the invention;

FIG. 15 is a longitudinal sectional view showing the structure of a ninth embodiment of a laser maintaining and repairing apparatus of the invention;

FIG. 19 is a longitudinal sectional view showing the structure of a thirteenth embodiment of a laser maintaining and repairing apparatus of the invention; and FIG. 20 is a longitudinal sectional view showing the structure of a conventional laser processing apparatus.

DETAILED DESCRIPTION OF THE PREFERRED EMBODIMENTS

Figures 2A, 2B:
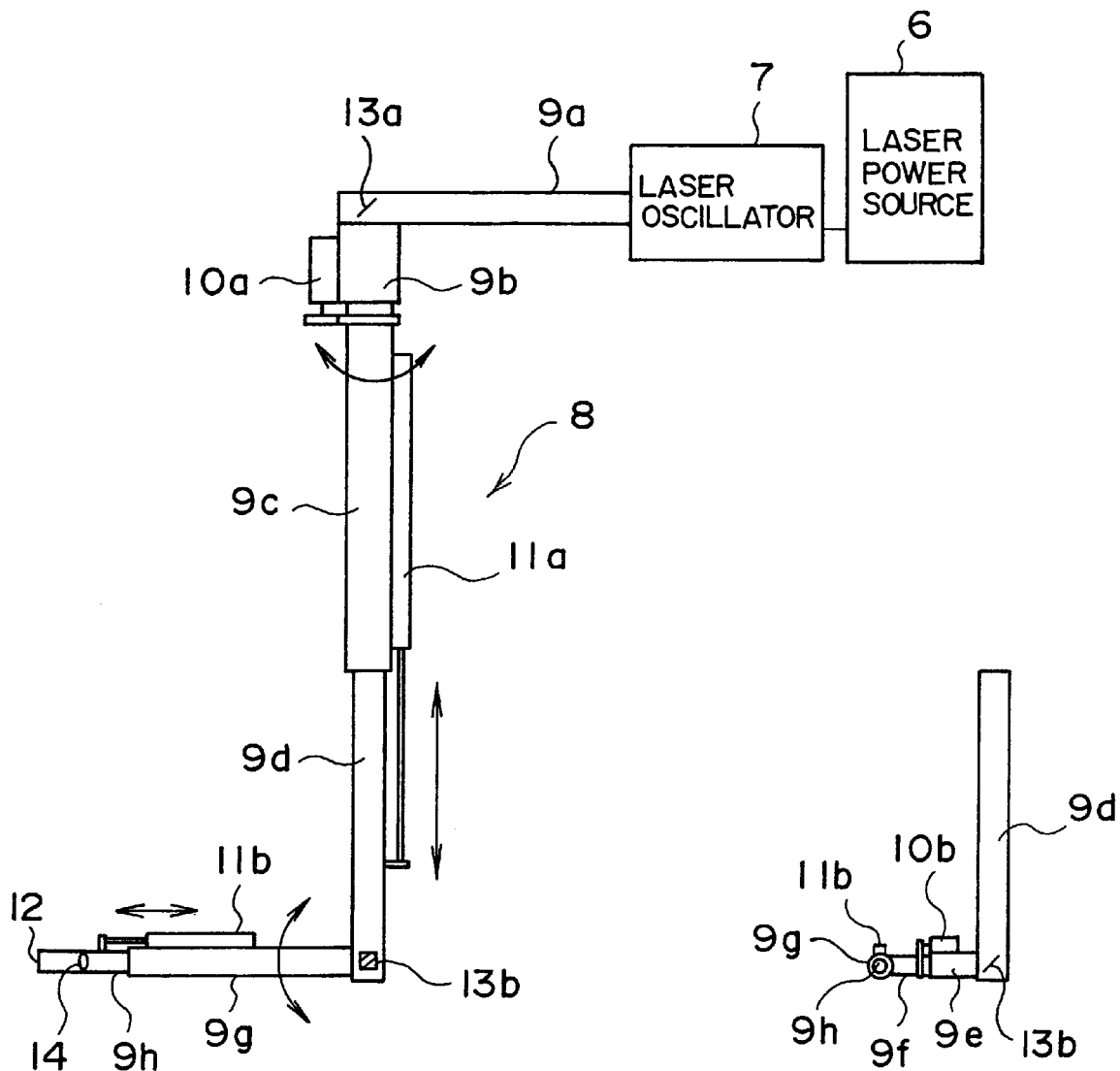
FIG. 2 is a view showing the structure of the first embodiment of the laser maintaining and repairing apparatus of the invention.

A laser maintaining and repairing apparatus according to the present invention will be described with respect to various embodiments according to accompanying drawings. As apparent from the above description, the laser maintaining and repairing apparatus according to the present invention improves beam guiding means for transferring a laser beam, emitting head for converging and emitting the laser beam, and a unit for remotely operating the emitting head to enable to utilize the laser beam of high energy density. And, sufficient effects can be obtained even by the combination or sole of them. In the embodiments as will be described, the improvements in the beam guiding means and the emitting head will be individually described, but these embodiments can be used in combination with each other.

First, a first embodiment of a laser maintaining and repairing apparatus according to the present invention will be described with reference to FIGS. 1 and 2.

In FIG. 1, a nuclear reactor pressure vessel 1 is shown with its upper cover removed. A cylindrical shroud body 2 as a structure in a nuclear reactor is provided in the nuclear reactor pressure vessel 1. The lower end of the shroud body 2 is welded to the bottom of the nuclear reactor pressure vessel 1. A lattice-like upper core plate 3 is fixed to the upper portion of the shroud body 2, and reactor core supporting plates 4 having circular holes provided at an equal pitch is fixed to the intermediate portion by bolts.

A fuel assembly is normally installed between the upper core plate 3 and the reactor core supporting plate 4. In the case of a series of preventive maintenance and repairing operation such as an inspection and verification in the shroud body 2, it is necessary to remove the fuel assembly by using a fuel replacing unit, and to insert an operating unit from the lattice of the upper core plate 3. The inner size of the lattice for inserting the operating unit is about 290 mm.

To prevent the radiation exposure of an operator, the maintenance operation in the nuclear reactor pressure vessel 1 is conducted remotely under water by submerging the structure in the reactor in water. The depth of water to the lowermost portion of the shroud body 2 is about 25 m.

An operation floor 5 is installed above the nuclear reactor pressure vessel 1. A laser power source 6 and a laser oscillator 7 connected to the laser power source 6 are installed on the operation floor 5. Beam guiding means 8 having the functions of elevating, horizontally turning and horizontally extending from the operation floor 5 to the lower portion in the shroud body 2 is connected to the laser oscillator 7.

The beam guiding means 8 includes a first beam guiding member 9a horizontally connected to the laser oscillator 7 as shown in FIG. 2(a), and a second beam guiding member 9b having a first rotating mechanism 10a and connected vertically to the end of the first beam guiding member 9a. A third beam guiding member 9c having a large diameter is vertically connected to the second beam guiding member 9b, and a fourth beam guiding member 9d having a small diameter and inserted into the third beam guiding member 9c.

A first extending and contracting mechanism 11a is fastened to the third beam guiding means 9c and the fourth beam guiding member 9d, and the fourth beam guiding member 9d is inserted into or drawn from the third beam guiding member 9c to be vertically stretchable by the operation of the first extending or contracting mechanism 11a.

A fifth beam guiding member 9e and a sixth beam guiding member 9f are connected, as shown at its side in FIG. 2(b), to the end of the fourth beam guiding member 9d in a horizontal direction. A seventh beam guiding member 9g and an eighth beam guiding member 9h are connected, as shown in FIG. 2(a), to the end of the sixth beam guiding member 9f. A second rotating mechanism 10b is provided at the fifth beam guiding member 9e. A second extending and contracting mechanism 11b for horizontally extending and contracting is provided at the seventh beam guiding member 9g having a large diameter and the eighth beam guiding member 9h having a small diameter.

An emitting head 12 is fastened to the end of the eighth beam guiding member 9h. A first reflecting member 13a (mirror) is inserted into the end in the first beam guiding member 9a, a second reflecting member 13b (mirror) is inserted into the lower portion in the fourth beam guiding member 9d, and a converging member 14 (lens) is inserted into the emitting head 12.

With such a structure, the laser power source 6 installed on the operation floor 5 is operated, a voltage is applied to the laser oscillator 7, and a laser beam 15 (referring to FIG.

1) is emitted. The laser beam 15 emitted from the laser oscillator 7 is reflected by the first reflecting member 13a in the first beam guiding member 9a of the beam guiding means 8, passed through the second to fourth beam guiding members 9b to 9d, reflected by the second reflecting member 13b, passed through fifth to eighth beam guiding members 9e to 9h, and converged to form a spot of a suitable bore on the surface 16 to be processed by the converging member 14.

The first and second rotating mechanisms 10a, 10b and first and second extending or contracting mechanisms 11a, 11b of the beam guiding means 8 are operated to scan the emitting head 12 to the vicinity of the surface 16 to be processed in the nuclear reactor pressure vessel 1 including the structure in the reactor or the nozzle, the laser beam 15 is emitted to the surface 16 to be processed, and preventive maintenance or repairing operation is conducted.

According to this first embodiment, the beam guiding means 8 has rotating and extending or contracting function to enable to transfer the laser beam 15 by the optical guide passage (laser beam transfer route) formed in the beam guiding means 8 and to drive the emitting head 12 to emit the laser beam to the surface 16 to be processed. Accordingly, the emitting head 12 can be easily approached and opposed to the surface 16 to be processed.

Since the laser oscillator 7 is disposed on the operation floor 5 having a spatial allowance, the laser beam 15 of high energy density can e emitted from the large-sized laser oscillator 7. The preventive maintenance and repairing operation such as laser peening, melting, cladding or welding can be conducted for the surface 16 to be processed in the nuclear reactor pressure vessel 1 including the structure in the reactor or the nozzle by this emitting.

Then, a second embodiment of a laser maintaining and repairing apparatus according to the present invention will be described with reference to FIGS. 3 and 4.

Figure 3:
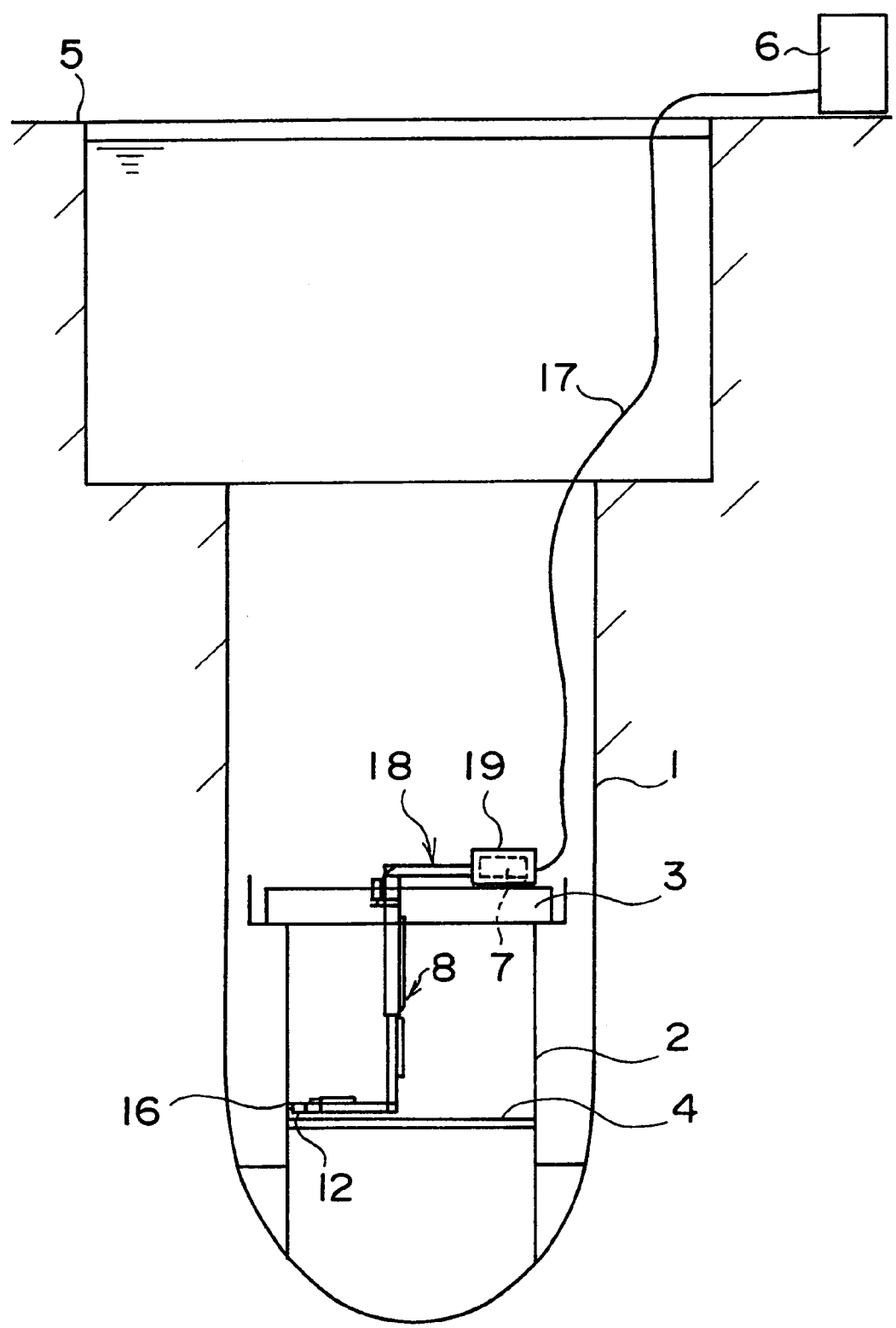
FIG. 3 is a longitudinal sectional view of the entire structure and installation example of a second embodiment of a laser maintaining and repairing apparatus of the invention.

In FIGS. 3 and 4, the reference numerals as those having the same functions as those in FIGS. 1 and 2 are denoted by the same references and the description thereof will be omitted.

The point of this second embodiment different from the first embodiment resides in that only a laser power source 6 is installed on an operation floor, a laser oscillator 7 is connected to the laser power source 6 via a cable line 17, and the laser oscillator 7 is installed in a nuclear reactor pressure vessel 1 together with a laser emitting unit 18 (including liquid-tight structure to be described later, beam guiding means 8 and emitting head 12). With this structure, the distance between the laser oscillator 7 and the surface 16 to be processed is shortened, thereby enabling to enhance the positioning accuracy in the case of emitting the laser beam. Since the beam guiding member of the beam guiding means 8 is shortened, the installation of the laser emitting unit 18 can be facilitated.

Figures 4A, 4B:
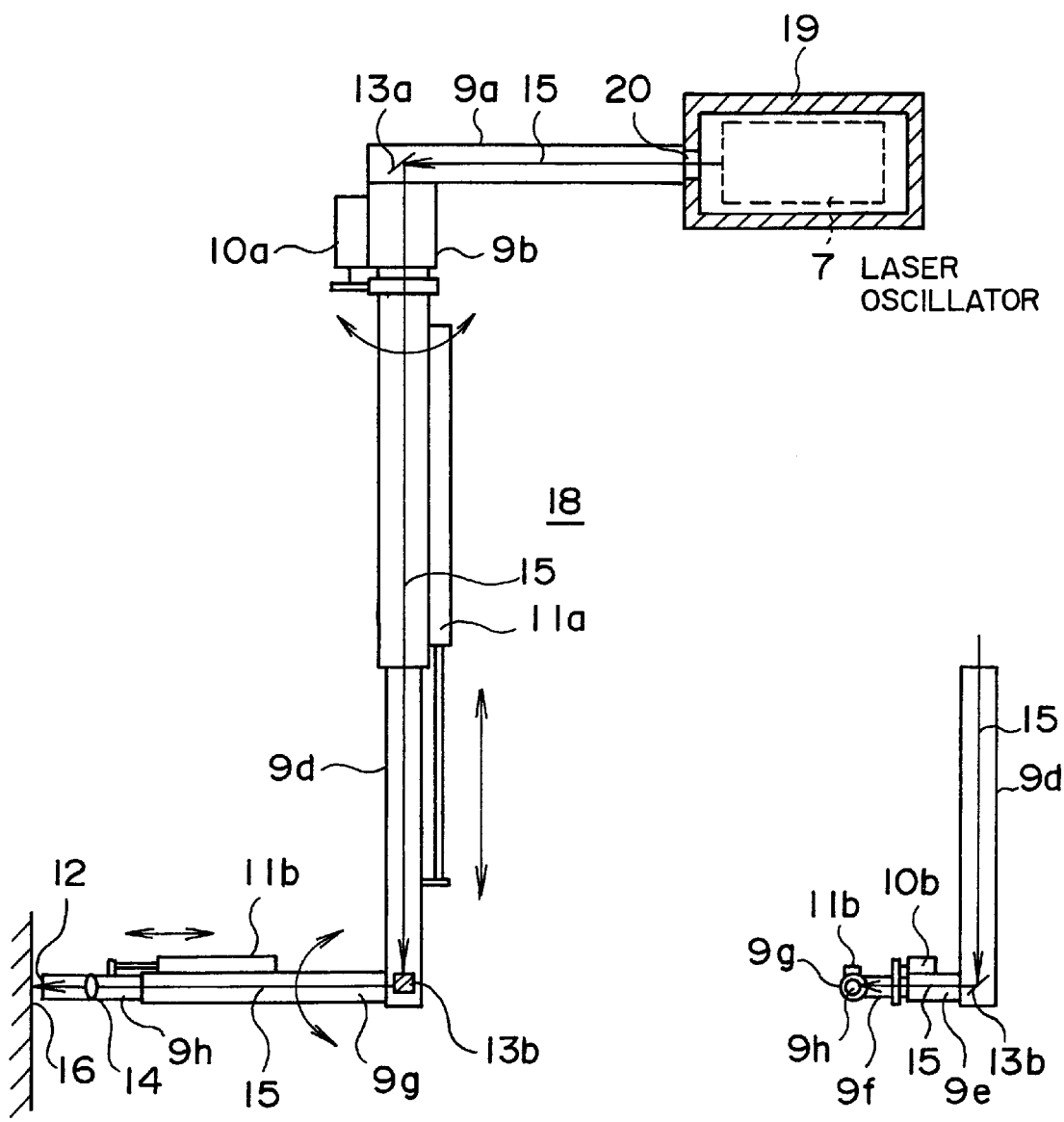
FIG. 4 is a view showing the structure of the second embodiment of the laser maintaining and repairing apparatus of the invention.

The laser emitting unit 18 includes a laser oscillator 7 shown in the first embodiment, a liquid-tight vessel 19, beam guiding means 8, and an emitting head 12. The liquid-tight vessel 19 has a laser transmission window 20 for transmitting the laser beam 15 emitted from the laser oscillator 7 as shown in FIG. 4(a). A first beam guiding member 9a is connected so as to cover the laser transmission window 20 of the liquid-tight vessel 19. The other structure is fundamentally the same as the first embodiment, and hence the description thereof will be omitted.

With such a structure, the laser beam 15 from the laser oscillator 7 is introduced from the laser transmission window 20 of the liquid-tight vessel 19 into the first beam guiding member 9a, converted to the surface 16 to be processed via the converging member 14 of the emitting head 12 similarly to the first embodiment while reflecting by the first reflecting member 13a, and preventive maintenance and repairing operation such as laser peening, melting or welding is conducted for the surface 16 to be processed in the nuclear reactor pressure vessel 1 including the structure in the reactor or the nozzle.

Since the first and second rotating mechanisms 10a, 10b and first and second extending or contracting mechanism 11a, 11b of the beam guiding means 8 are operated to enable to scan the emitting head 12 to the surface 16 to be processed, the range to be processed can be all executed.

According to the second embodiment, the distance between the laser oscillator 7 and the surface 16 to be processed can be shortened, and hence the positioning accuracy for emitting the laser can be easily enhanced. Further, since the beam guiding member which must be installed in high relatively positional accuracy at the time of installing can be shortened, the operation at the time of installing can be facilitated.

Then, a third embodiment of a laser maintaining and repairing apparatus according to the present invention will be described with reference to FIGS. 5 and 6.

Figure 5:
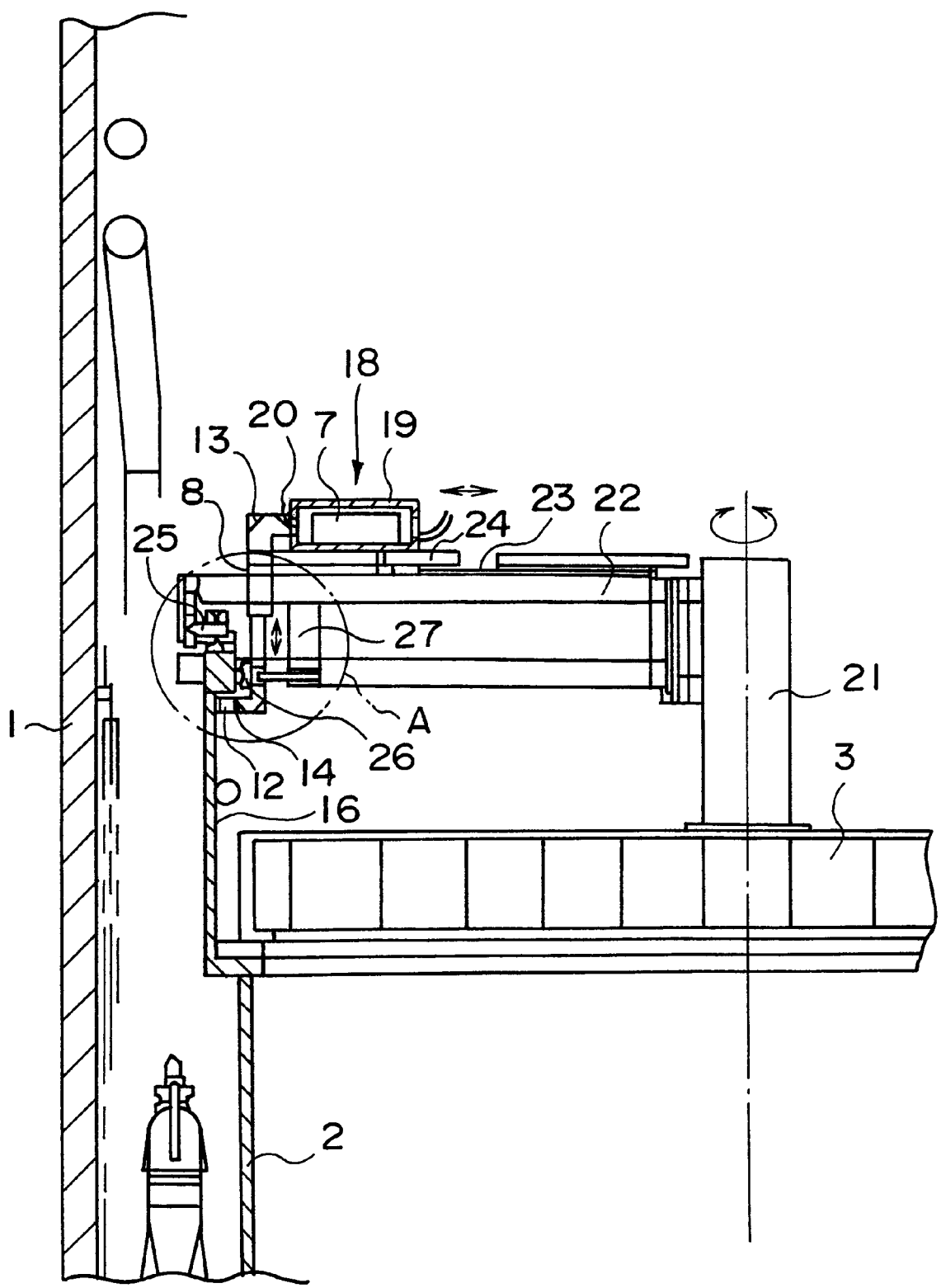
FIG. 5 is a longitudinal sectional view of the entire structure and installation example of a third embodiment of a laser maintaining and repairing apparatus of the invention.
Figure 6:
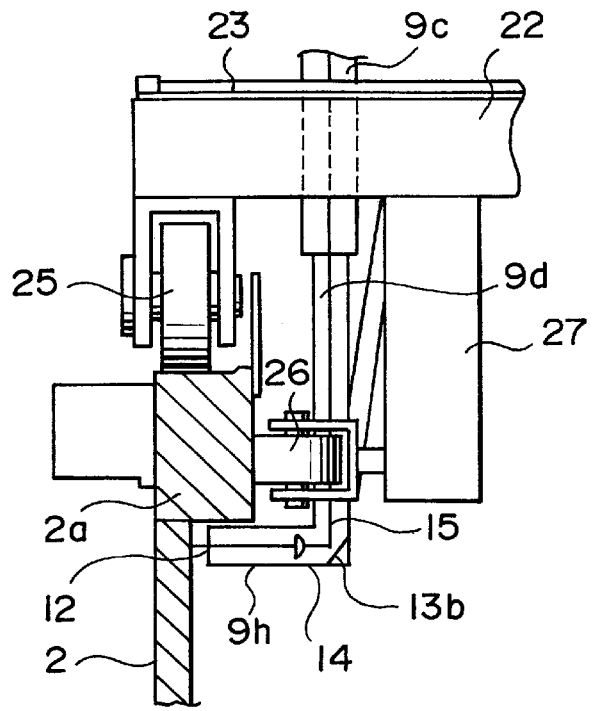
FIG. 6 is a view showing the structure of the third embodiment of the laser maintaining and repairing apparatus of the invention.

In FIGS. 5 and 6, the same reference numerals as those having the same functions as those in FIGS. 1 to 4 are denoted by the same reference numerals, and the description thereof will be omitted.

The point of the third embodiment different from the second embodiment resides in that a center post 21 is installed on an upper core plate 3, a turning unit 22 for horizontally turning at the center post 21 as a center is provided, a rail 23 is laid on the turning unit 22, a moving carriage 24 traveling on the rail 23, and a laser emitting unit 18 having a liquid-tight vessel 19 and beam guiding means 8 is provided on the moving carriage 24.

FIG. 6 shows an enlarged portion A in FIG. 5. A vertical wheel 25 is fastened to the lower portion of the end of the turning unit 22, and the wheel 25 travels along the upper end face of the upper edge 2a of the shroud. A horizontal wheel 26 traveling along the upper inner surface of the shroud upper edge 2a is fastened to the lower portion of the turning unit 22 via a horizontal wheel mounting member 27.

In this third embodiment, the turning unit 22 is horizontally turned at the center post 21 installed on the upper core plate 3 as a center. Since the liquid-tight vessel 19 containing the laser oscillator 7 is installed on the moving carriage 24 installed on the turning unit 22, the laser emitting unit 18 is movable in the horizontal direction. The emitting head 12 of the laser emitting unit 18 is vertically movable by the extending or contracting mechanism fastened to the beam guiding member. A reflecting member 13 (mirror) is provided in the beam guiding member, and a converging member 14 (lens) is assembled with the emitting head 12.

According to this third embodiment, the turning unit remotely driven is provided at the upper core plate 3 of a reactor core via the center post 21, and the moving carriage 24 and the laser emitting unit 18 are provided at the turning unit 22. Since the emitting head 12 is imparted by three degrees of freedoms of horizontally turning, horizontally extending and vertically elevating to the surface 16 to be processed when the inner surface in the shroud 2 is used as the surface 16 to be processed, the preventive maintenance and repairing operation such as laser peening, melting, cladding or welding can be facilitated.

Since the turning unit 22 can be smoothly rotatably driven by the vertical wheel 25 and the horizontal wheel 26 running on the upper edge 2a of the shroud body 2, the preventive maintenance operation in the nuclear reactor can be further facilitated.

Figure 7:
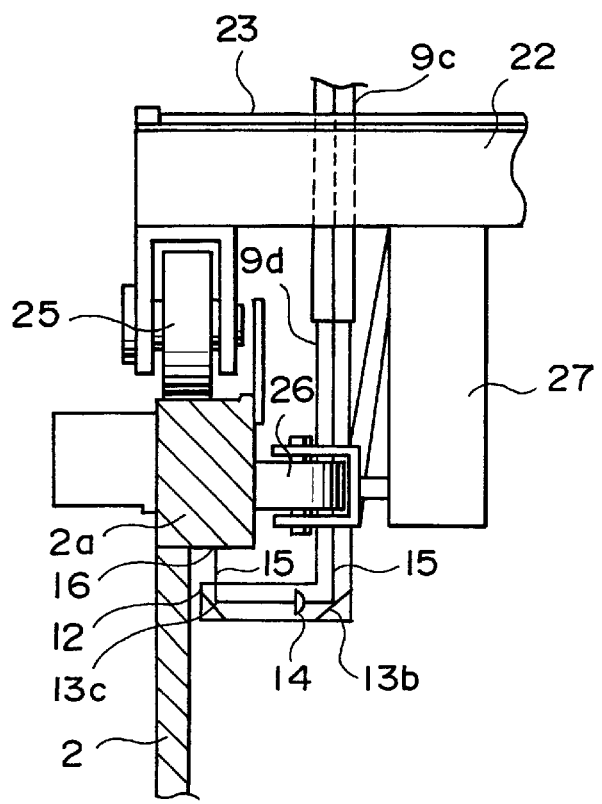
FIG. 7 is a longitudinal sectional view showing a modified example of the third embodiment of the laser maintaining and repairing apparatus of the invention.

FIG. 7 shows other modified example of the third embodiment, where the same reference numerals as those in FIG. 6 are denoted by the same reference numerals. In FIG. 7, the lower surface of the shroud upper edge 2a is the surface 16 to be processed, and the preventive maintenance and repairing operation of the surface 16 to be processed is conducted.

In this modified embodiment, a third reflecting member 13c is placed between the end of an emitting head 12 and a converging member 14. A horizontal laser beam 15 emitted from the second reflecting member 13b via the converging member 14 is reflected upward in the perpendicular direction, and the laser beam 15 is emitted to the surface 16 to be processed of the lower surface of the shroud upper edge 2a. Thus, the surface 16 to be processed existing at the downward portion of the lower surface of the shroud upper edge 2a can be certainly emitted by the laser beam 15.

Then, a fourth embodiment of a laser maintaining and repairing apparatus according to the present invention will be described with reference to FIGS. 8 and 9.

Figure 8:
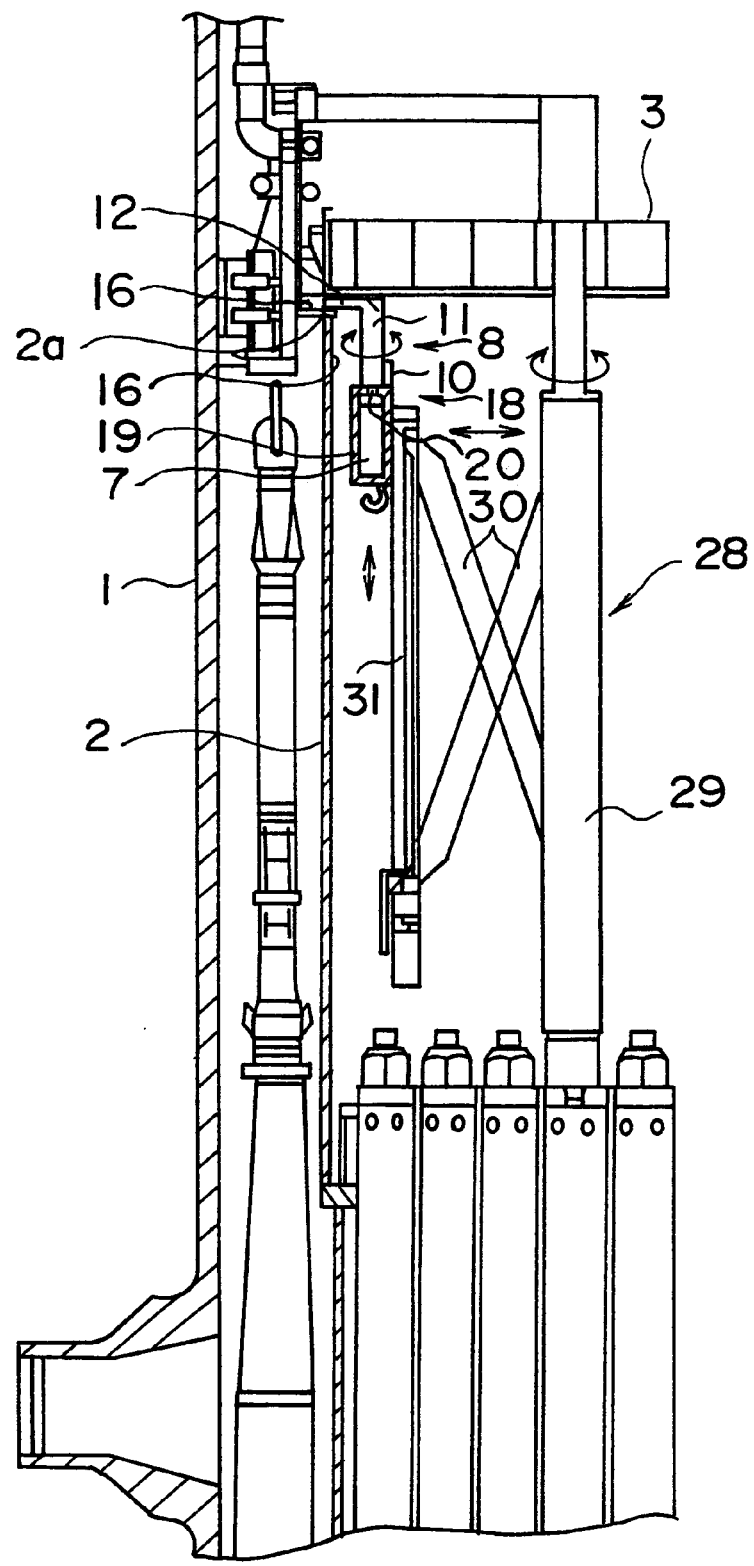
FIG. 8 is a longitudinal sectional view of the entire structure and installation example of a fourth embodiment of a laser maintaining and repairing apparatus of the invention.
Figure 9:
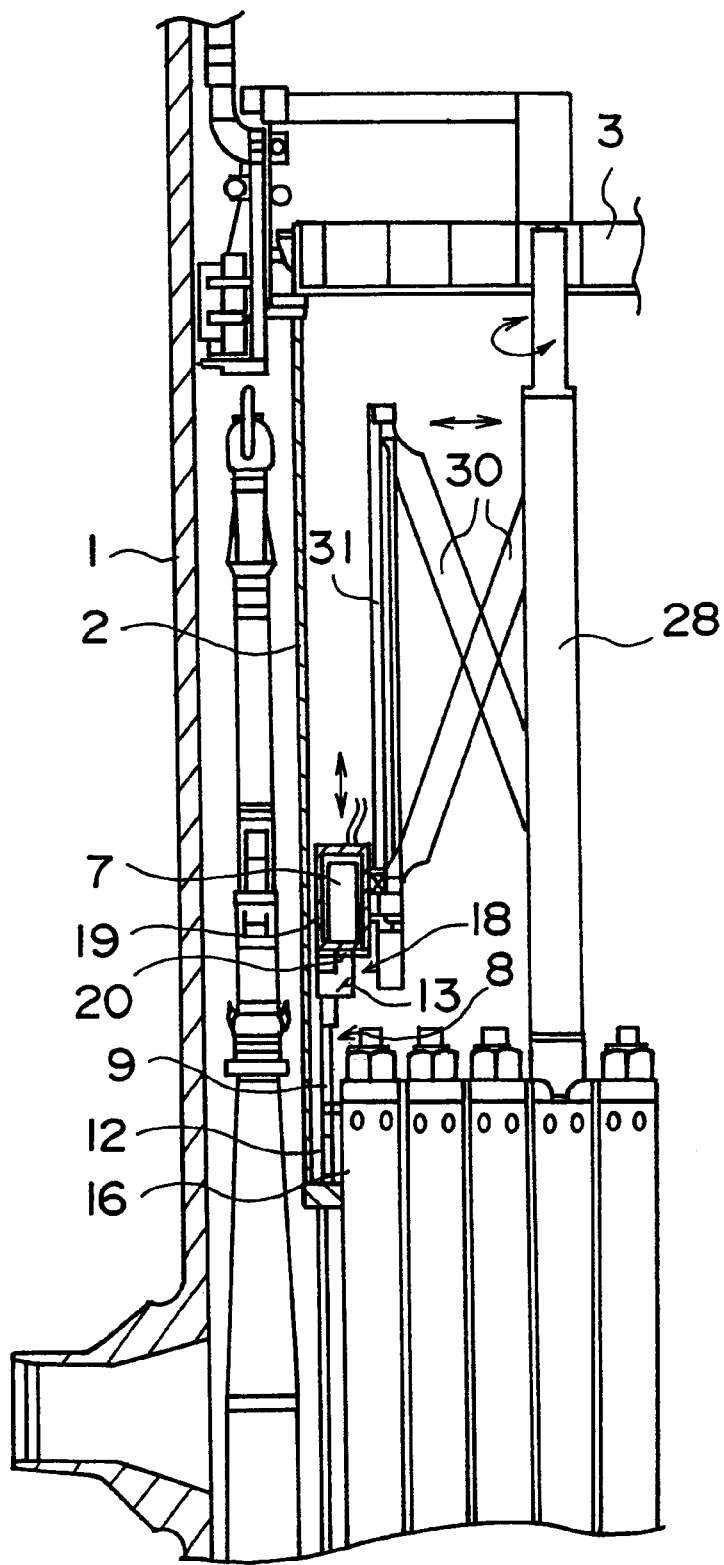
FIG. 9 is a longitudinal sectional view showing the fourth embodiment of the laser maintaining and repairing apparatus of the invention during the execution of a welded portion of the lower portion of a shroud body.

FIG. 8 shows the repair of the vicinity the welded portion of a shroud upper edge, and FIG. 9 shows the state that the welded portion of the shroud lower portion is repaired, where the same reference numerals as those in FIGS. 1 to 7 are denoted by the same reference numerals, and the description thereof will be omitted.

In the fourth embodiment, a remote driver 28 having turning, extending and vertically elevating mechanism is provided at the upper core plate 3 of a reactor core, and a liquid-tight vessel 19 containing a laser oscillator 7 is provided in the remote driver 28. the liquid-tight vessel 19 is installed in water in the reactor in the nuclear reactor pressure vessel 1, and a laser emitting unit 18 includes beam guiding means 8 combined with a plurality of beam guiding members with the transparent laser transmission window 20 of the liquid-tight vessel 19.

Installing the remote driver 28 on the upper core plate 3 of the reactor core, the laser emitting unit 18 is mounted at the upper and lower portion of the remote driver 28 in the state that it has a the sectional shape smaller than that of the lattice of the upper core plate 3.

Then, after the emitting head 12 is positioned at the position to be processed by the degrees of freedoms of vertically, turning and extending of the remote driver 28, and the emitting head 12 is scanned to the surface 16 to be processed by using the rotating mechanism 10 and extending or contracting mechanism 11 of the laser emitting unit 18, and operated.

The remote driver 28 has the structure that the extending arm 30 of an X link and a body 31 are contained in a cylindrical case 29 having an outer diameter of 270 mm and the entire length of 400 mm. The body 31 has an elevating mechanism (not shown) of the emitting head 12 of the laser emitting unit 18, and the degrees of freedoms of the body 31 are three degrees of freedoms of horizontally turning, horizontally extending and vertically elevating. The operating stroke is +180 degrees of turning, about 2,000 mm of extending and about 2,000 mm of vertically elevating, and has the operating range of covering the entire inner wall area of the shroud body 1 at the time of installing at the center of the reactor core.

When the extending arm 30 contracts, the elevating mechanism provided at the body 31, the body 31, and the extending arm 30 are contained in the case 29. Thus, it can pass the hole of the reactor core supporting plate 4, and can be applied to the operation in the shroud body 2 of the lower portion of the reactor core supporting plate 4.

FIG. 9 shows the state that the lower welded portion of the shroud body 2 is the surface 16 to be processed, and the beam guiding member 9 is vertically extended, and the emitting head 12 is opposed to the surface 16 to be processed, and FIG. 8 and the other structure are not substantially different, and hence the description thereof will be omitted.

Figure 10:
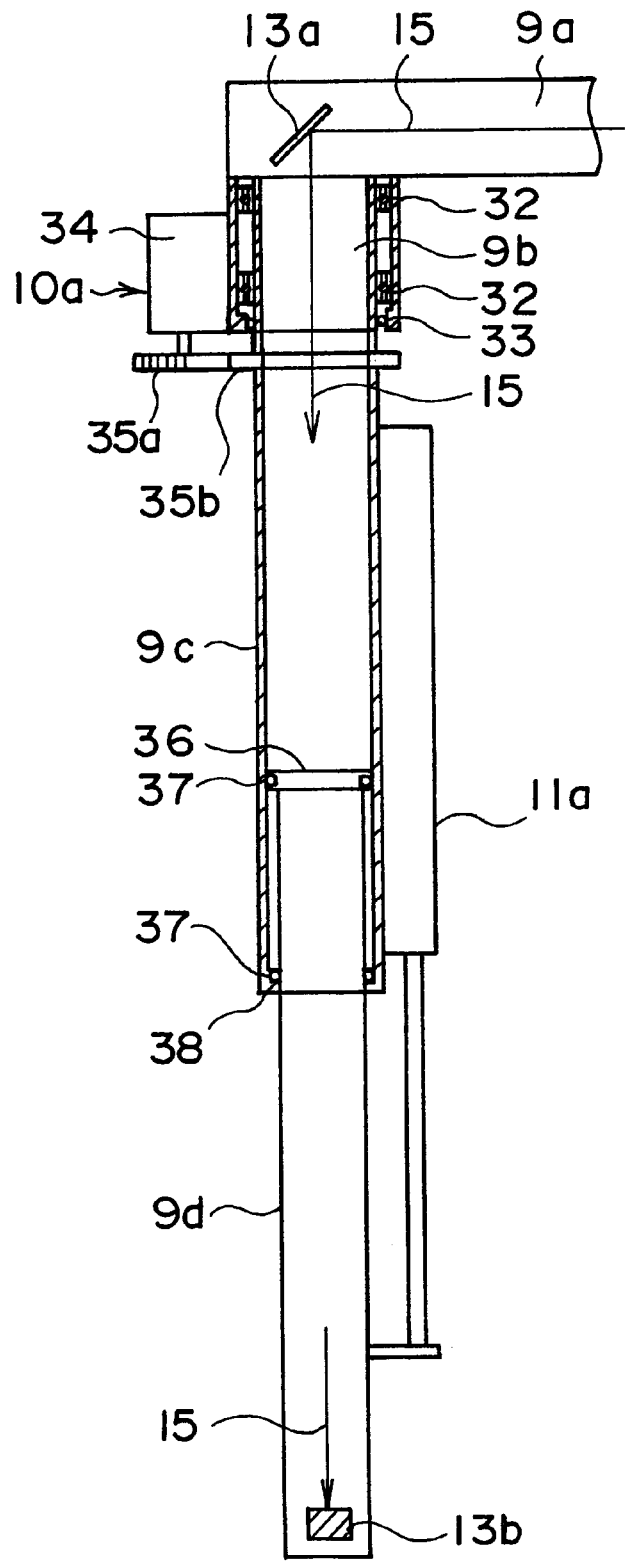
FIG. 10 is a longitudinal sectional view showing the structure of a fifth embodiment of a laser maintaining and repairing apparatus of the invention.

Then, a fifth embodiment of a laser maintaining and repairing apparatus according to the present invention will be described with reference to FIG. 10.

The point of this fifth embodiment different from the first embodiment resides in that first to fourth beam guiding members 9a to 9d are sufficient liquid-tight structures, the beam guiding members 9b and 9c are mounted rotatably with each other, and the beam guiding members 9c, 9d are mounted extensibly while holding liquid-tight.

That is, a pair of upper and lower bearings 32 are provided on the outer periphery of the second beam guiding member 9b to rotate the third beam guiding member 9c, an O-ring 33 is provided, and the upper outer surface of the third beam guiding member 9c is liquid-tight. A rotation driving motor 34 is provided at the outside of the second beam guiding member 9b, a first gear 35a is provided on the rotary shaft of the motor 34, and a second gear 35b rotating in engagement with the first gear 35a is provided on the upper outer periphery of the third beam guiding member 9c.

A flange 36 is provided on the upper end of the fourth beam guiding member 9d containing the second reflecting member 13b inserted into the third beam guiding member 9c, an O-ring 37 is engaged with the outer surface of the flange 36, further an inner annular member 38 is provided on the inner surface of the lower end of a third beam guiding member 9c, the O-ring 37 is engaged with the annular member 38, and the third beam guiding member 9c and the fourth beam guiding member 9d are held liquid-tight by the pair of upper and lower O-rings 37.

This fifth embodiment includes the second beam guiding member 9b and the third beam guiding member 9c rotatable with one another by a rotating mechanism 10a formed of the motor 34 and the gears 35a, 35b while holding the liquid-tight by the bearing 32 and the O-ring 33, and the third beam guiding member 9c and the fourth beam guiding member 9d extensible and contractible by the extending or contracting mechanism 11a while holding liquid-tight by the O-ring 37.

Therefore, according to this fifth embodiment, the laser beam 15 is propagated in the atmosphere having smaller loss than that in the water, and hence the loss can be further reduced, and the output of the laser oscillator 7 can be lowered. Or, as long as the optical strength of the optical system of the emitting head 12 is allowed, the output of the laser oscillator 7 can be enhanced.

Figure 11A:
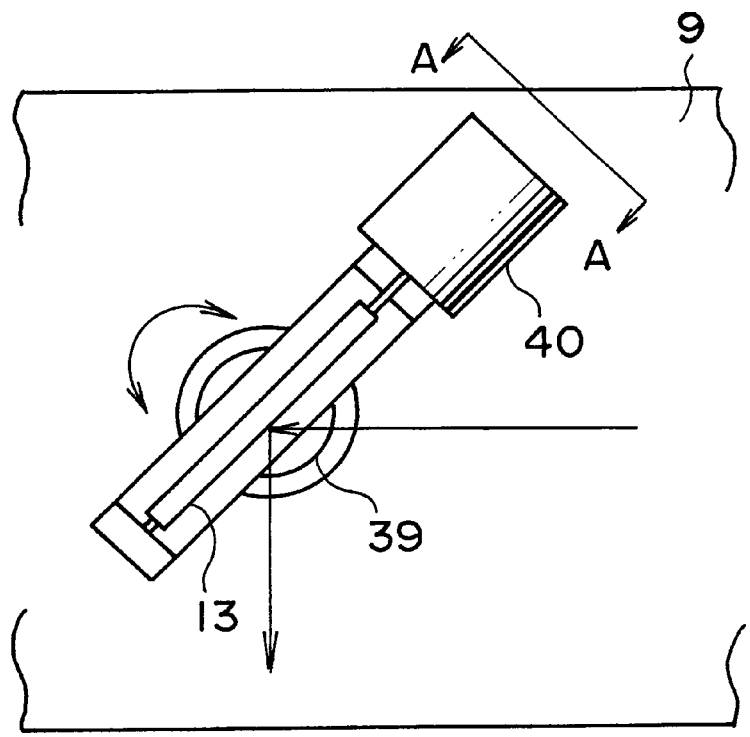
FIG. 11 is a view showing an aligning mechanism of a reflecting member in a sixth embodiment of a laser maintaining and repairing apparatus of the invention.
Figure 11B:
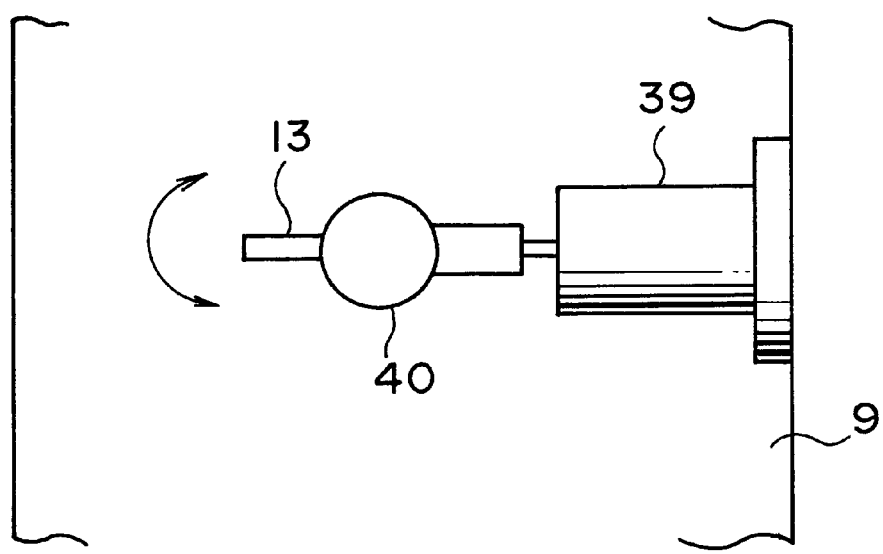

Then, a sixth embodiment of a laser maintaining and repairing apparatus according to the present invention will be described with reference to FIGS. 11(a) and 11(b).

This sixth embodiment comprises a first motor 39 and a second motor 40 of two motors provided in a beam guiding member 9 so as to rotatably align reflecting members provided in the beam guiding member 9 remotely.

According to the sixth embodiment, the first and second motors 39, 40 to become the actuator and centering measuring unit of the reflecting member 13 are provided so as to enable to align remotely at the angle of the reflecting member 13, thereby forming the mechanism for rotatably aligning around the axes linearly moving from each other. Even if the positional deviation occurs due to the deflection of the beam guiding member 9, it can be remotely aligned by the aligning mechanism, and the preventive maintenance and repairing operation can be conducted without interrupting the operation. A prism may reused instead of the reflecting member 13.

In the above-described embodiment, tubular beam guiding member is used instead of the optical fiber as beam guiding member. Thus, the laser beam can be transferred in the atmosphere, and the laser beam of higher energy density can be transferred as compared with the optical fiber. Further, since the laser beams guided in the beam guiding member become substantially parallel, the request for convergence at the emitting head is alleviated.

Then, seventh embodiment that the laser beam of high energy density can be emitted by enhancing the optical strengths of the components of the emitting head will be described.

Figure 12:
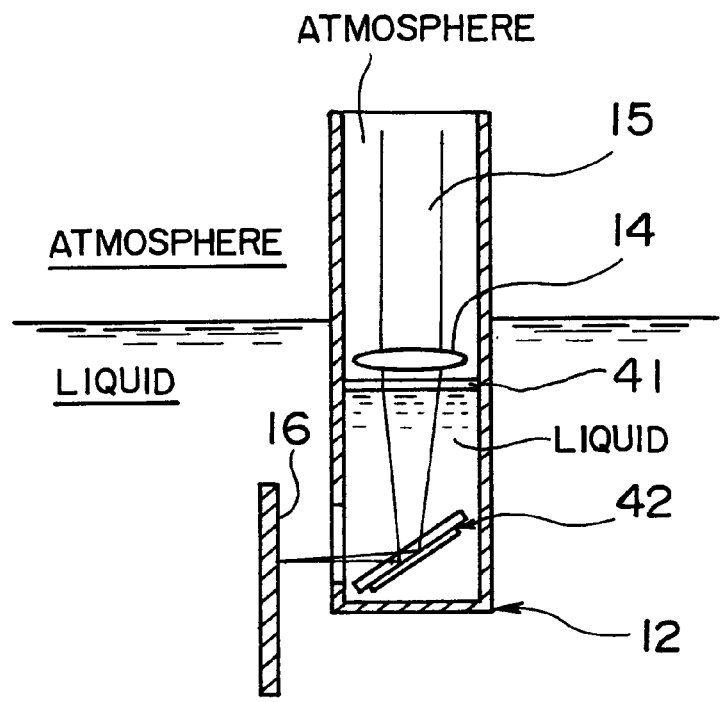
FIG. 12 is a longitudinal sectional view showing the structure of a seventh embodiment of a laser maintaining and repairing apparatus of the invention.

FIG. 12 is a structural view showing the seventh embodiment of a laser maintaining and repairing apparatus according to the present invention. As shown in FIG. 12, the emitting head 12 of the laser maintaining and repairing apparatus installed in liquid includes a converging member 14 for converging the laser beam 15 transmitted from a laser oscillator (not shown) via beam guiding means, an optical window 41 for sealing liquid for holding the converging member 14 in the air (inside the beam guiding member), and a reflecting mirror 42 for reflecting the converged laser beam 15 to emit it to the surface 16 to be processed.

According to the laser maintaining and repairing apparatus of this seventh embodiment, as shown in FIG. 12, the emitting head 12 of the laser maintaining and repairing apparatus installed in the liquid installs the reflecting mirror 42 in the liquid, and installs the optical window 41 near the converging member 14, and hence the emitting area of the laser beam emitted to the optical window 41 is increased, and the durability of the optical window 41 can be alleviated to the energy density or less received by the damage.

Further, the reflecting mirror 42 reflects the laser beam not by the surface reflecting film but by the total reflection on the back surface.

Figure 13:
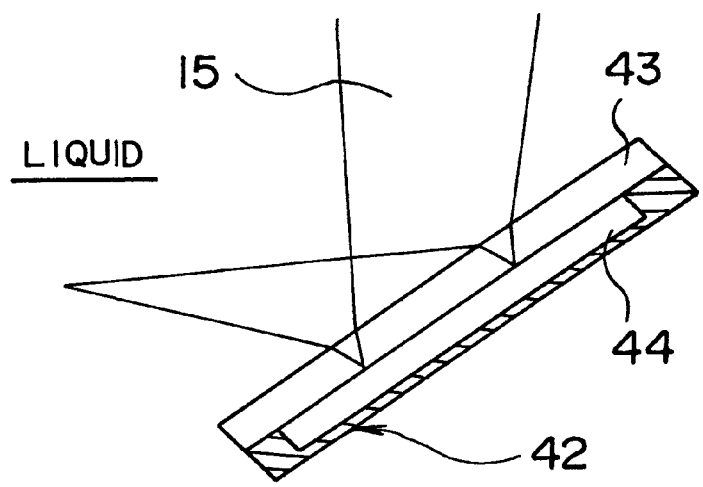
FIG. 13 is a view showing a reflecting mirror in a seventh embodiment of a laser maintaining and repairing apparatus of the invention.

FIG. 13 shows the structure of the reflecting mirror 42. The reflecting mirror 42 includes, for example, a transparent member 43 made of quartz glass and a reflecting layer 44 provided on the back surface of the member 43.

When the laser beam 15 is regulated at the angle of the reflecting mirror 42 so as to be incident to the back surface of the transparent member 43 at the angle larger than the critical angle of the total reflection in the boundary between the transparent member 43 and the reflecting member 44, most of the laser beam is reflected by the total reflection except the slight Fresnel reflection on the surface of the transparent member. The optical strength in this case becomes about 15J/cm² with respect to the second harmonic wave of a YAG laser, and the energy necessary for the execution can be sufficiently reflected.

In the case that only the transparent member of quartz glass is provided without providing the reflecting layer 44 or in the case that the reflecting mirror 42 is installed in the air, most of the laser is transmitted through the transparent member such as the quarts glass without total reflection, and cannot be used as the reflecting mirror.

The reflecting layer 44 may be of substance having sufficiently smaller refractive index than the refractive index of about 1.4 in the case that the transparent member 43 is made of the quarts glass. Of course, it may be the vacuum layer of refractive index of 1.0.

Further, the advantages of the reflecting mirror 42 are that not only the energy durability is increased but also the wavelength is not limited, comparing the wavelength of the laser beam reflected on the reflecting film is determined to one, by considering the incident angle of the laser beam 15 to maintain the total reflection though the critical angle for varying the refractive index of the mirror medium by the wavelength, accordingly, if the incident angle of the laser beam 15 is larger than the critical angle of the total reflection, the reflecting mirror 42 can be installed at an arbitrary angle. therefore, according to the reflecting mirror 42, though the conventional reflecting mirror is held only at the specific angle with respect to the laser beam, the emitting site of the laser beam can be varied to process the wide range by varying the holding angle in a predetermined range.

The reflecting mirror 42 according to the present invention has the advantage of low-cost manufacture since the reflecting film of expensive dielectric material multiple layer film is not used.

According to this seventh embodiment, the surface modification of the structural material can be executed in water by using the laser beam of high energy density which has been impossible by the optical strength limit for the laser beam of the optical component so far.

FIG. 14 shows an eighth embodiment of a laser maintaining and repairing apparatus according to the present invention. In the following respective embodiments, the same reference numerals as those in FIG. 12 are denoted by the same reference numerals, and the description will be explained.

As shown in FIG. 14, the emitting head 12 of the laser maintaining and repairing apparatus installed in liquid includes a converging member 14 for converging the laser beam 15 transmitted from a laser oscillator (not shown) via beam guiding means and for constituting an element for liquid-tightly sealing the beam guiding means, and a reflecting mirror 42 for reflecting the converged laser beam 15 to emit it to the surface 16 to be processed.

The respective components are the same as those in the seventh embodiment, but in this eighth embodiment different from the seventh embodiment, the beam guiding means is liquid-tightly sealed by the converging member 14 without using the optical window. In the case that the one side of the converging member 14 is contacted with the liquid different from the air, the refractive index of the liquid is larger than that of the air, and the focal length of the lens becomes longer than that of the air. In the case that the liquid is water, the focal length is about 1.3 times as large as that of the air. In this case, the change of the focal length by the liquid is previously presumed, and the position of the converging member 14 is regulated. Then, the apparatus can be simplified without necessity of the optical window for sealing the liquid.

FIG. 15 is a structural view of a ninth embodiment of laser maintaining and repairing apparatus according to the present invention.

As shown in FIG. 15, the emitting head 12 of the laser maintaining and repairing apparatus installed in liquid converging member 14 for converging the laser beam 15 transmitted from a laser oscillator (not shown) via beam guiding means and constituting an element for liquid-tightly sealing the beam guiding means, a reflecting mirror 42 for reflecting the converged laser beam 15 to emit it to the surface 16 to be processed, and a jet nozzle 9 for injecting liquid for removing laser beam scatter causing substance to the surface 16 to be processed. That is, in this ninth embodiment, the liquid jet nozzle 45 is added to the eighth embodiment.

When the laser beam 15 of high energy density is emitted to the surface 16 to be processed, the surface of the portion to be processed generates a plasma, but in this case, bubble is generated by the plasma of high temperature in this case. Further, clad adhered to the surface of the portion to be processed is removed, and floated in the liquid. These bubbles or clad are called laser beam scatter causing substance, and when the substance is on the optical path of the laser beam 15, the laser beam 15 is scattered, and causes sufficient energy not to be emitted to the surface 16 to be processed.

Therefore, the liquid jet nozzle 45 for injecting clean liquid in which impurities are filtered by a filter toward the surface 16 to be processed during processing is provided to remove laser beam scatter causing substance such as the bubbles or clad, thereby removing the laser beam scatter causing substance such as the bubbles or clad from the emitting portion or laser beam path to enable to always emit the laser beam 15 of sufficient energy.

The emitting head 12 is preferably devised to provide a hole to remove the bubbles of the surface of the converging member 14 by the flow of the jet so as not to retain the bubbles or dusts near the converging member 14 and to extract the bubbles.

Figure 16:
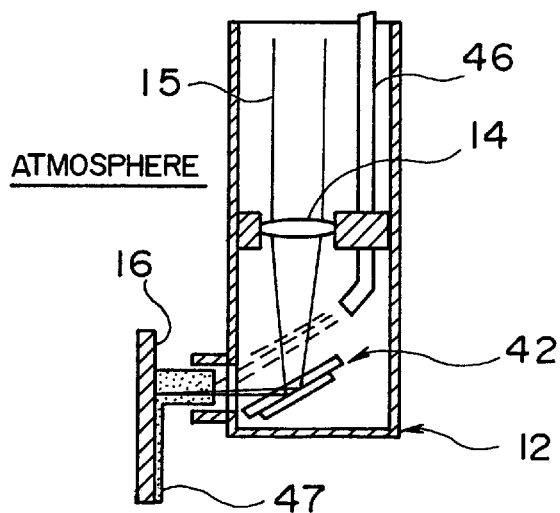
FIG. 16 is a longitudinal sectional view showing the structure of a tenth embodiment of a laser maintaining and repairing apparatus of the invention.

FIG. 16 is a view showing a tenth embodiment of a laser maintaining and repairing apparatus according to the present invention.

As shown in FIG. 16, the emitting head 12 of the laser maintaining and repairing apparatus installed in the air includes a converging member 14 for converging the laser beam 15 transmitted from a laser oscillator (not shown) via beam guiding means and constituting an element for liquid-tightly sealing the beam guiding means, a reflecting mirror 42 for reflecting the converged laser beam 15 to emit it to the surface 16 to be processed in the air, and a liquid jet nozzle 46 for forming a liquid layer on the surface of the laser emitting portion.

In the execution of improving the surface residual stress of a structural material, the liquid for enclosing the pressure of plasma is required, and in this execution, it is necessary to emit the laser beam 15 to the surface 16 to be processed in the liquid. However, in this tenth embodiment, liquid is injected by a jet nozzle 46 to the surface 16 to be processed, and a liquid layer 47 is formed on the emitting surface. Thus, the processing can be executed even in the air. According to the tenth embodiment, the processing can be executed in the case that the liquid is removed for other processing or the liquid is not yet fully filled during installation.

Figure 17:
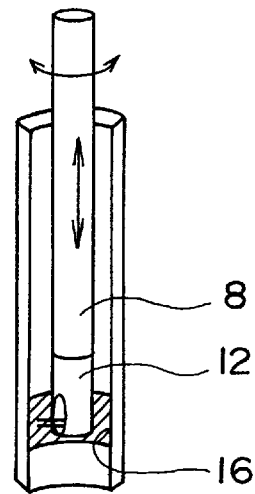
FIG. 17 is a longitudinal sectional view showing the structure of an eleventh embodiment of a laser maintaining and repairing apparatus of the invention.

FIG. 17 is a view showing an eleventh embodiment of a laser maintaining and repairing apparatus according to the present invention.

As shown in FIG. 17, the emitting head 12 of the laser maintaining and repairing apparatus installed in liquid is formed integrally cylindrically with the end of beam guiding means 8. This is rotated in the circumferential direction or movable in the axial direction by a driving mechanism.

The laser beam from a laser oscillator (not shown) is emitted laterally from the emitting head 12 via beam guiding means 8. According to such a structure, when the inner surface (surface 16 to be processed) of a cylindrical workpiece such as a pipe is processed, the end of the beam guiding means 8 and the emitting head 12 are formed thinner cylinder than the inner diameter of the pipe, and hence the processing of the site which has been heretofore difficult to be processed can be processed.

Figure 18:
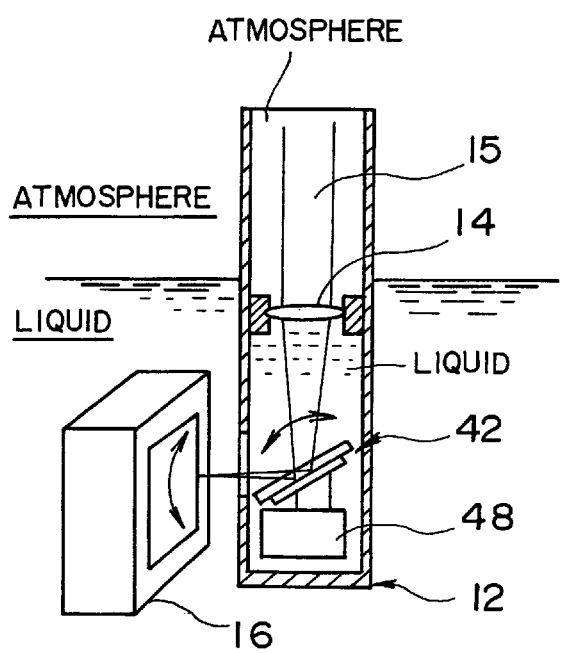
FIG. 18 is a longitudinal sectional view showing the structure of a twelfth embodiment of a laser maintaining and repairing apparatus of the invention.

FIG. 18 is a structural view showing a twelfth embodiment of a laser maintaining and repairing apparatus according to the present invention.

As shown in FIG. 18, the emitting head 12 of the laser maintaining and repairing apparatus installed in liquid includes a converging member 14 for converging the laser beam 15 transmitted from a laser oscillator (not shown) via beam guiding means and constituting an element for liquid-tightly sealing the beam guiding means, a reflecting mirror 42 for reflecting the converted laser beam 15 to emit it to the surface 16 to be processed, and an aligning mechanism for aligning to drive the reflecting mirror 42.

The reflecting mirror 42 can reflect the laser beam 15 in an arbitrary direction to emit it. With such a structure, when a linear or planar surface 16 to be processed is processed, the aligning mechanism 48 is contained in the emitting head 12 to increase in size the emitting head 12, but the mechanism for driving the emitting head 12 can be stopped during emitting, and hence the error of the emitting position due to the continuous driving can be remotely prevented, and further the optical axis is set at the arbitrary angle of oblique direction to be emitted.

According to this twelfth embodiment, the disadvantages of the conventional reflecting mirror which can reflect only at a predetermined angle is overcome, and the reflecting mirror can be regulated to be driven at the arbitrary angle if the angle is lager than the critical angle for the laser beam 15 of the high energy density, the emitting site of the laser beam can be altered by changing the angle of the reflecting mirror, thereby facilitating the processing by the precise laser beam.

FIG. 19 is a structural view showing a thirteenth embodiment of a laser maintaining and repairing apparatus according to the present invention.

As shown in FIG. 19, this thirteenth embodiment separates laser beam guiding means and emitting head supporting driver.

According to this thirteenth embodiment, the emitting head 12 of the laser maintaining and repairing apparatus is installed in liquid, uses an optical fiber 49 as beam guiding means, and transfers the laser beam from a laser oscillator 7 to emit it to the surface 16 to be processed.

On the other hand, the emitting head 12 is driven vertically and laterally by a supporting driver 50 to sequentially emit the laser beam to the linear or planar surface 16 to be processed to be processed.

With such a structure, the laser beam can be transmitted to the portion to be processed to be a complicated optical guide path which cannot be directly observed via a flexible optical fiber 49, and hence the laser beam can be transmitted via the optical guide path bent in a complicated shape, and the portion to be processed at the end of such an optical guide path can be processed.

According to the laser maintaining and repairing apparatus in accordance with the present invention, since the laser beam is guided by the tubular beam guiding member instead of the optical fiber, the laser beam is generally passed through the atmosphere to be able to transmit the laser beam of higher energy density than that of the optical fiber.

Further, since parallel beams are easily obtained in the case that the laser beam is transmitted in space, the requirement for reducing the magnifying ratio is alleviated, and since the focal depth can be deepened, the requirement for positioning can be moderated.

Since the beam guiding means includes the turning and extending or contracting mechanism, the emitting head is easily approached to the surface to be processed and opposed thereto. On the other hand, the laser beam of high energy density can be emitted to the emitting head from a large-sized laser oscillator in a separate wide place.

Therefore, according to the laser maintaining and repairing apparatus of the invention, when the laser maintaining and repairing apparatus is used for a nuclear reactor vessel, the surface to be processed in the structure in the reactor or the nuclear reactor pressure vessel including a nozzle can be executed for preventive maintenance and repairing operation such as laser peening, melting, cladding or welding.

According to the laser maintaining and repairing apparatus in accordance with the present invention, the laser oscillator is contained in the liquid-tight vessel, and hence the distance between the laser oscillation and the surface to be processed can be shortened in the underwater operation, and the transmission loss of the laser beam can be reduced. Further, the positioning accuracy can be easily enhanced, the beam guiding member required for relative positional accuracy can be shortened, and hence the operation at the time of installing is facilitated.

The laser maintaining and repairing apparatus according to the present invention, the center post is stood on an upper core plate of an upper portion of the shroud body in the nuclear reactor pressure vessel, since the emitting head has three degrees of freedoms of turning, horizontally extending and elevating by the turning driver remotely driven via the center post, the turning and extending and contracting mechanism of the laser emitting unit on the upper core plate, the laser beam can be certainly emitted to the surface to be processed, thereby conducting the preventive maintenance and repairing operation such as laser peening, melting, cladding or welding of the nuclear reactor pressure vessel and the structure in the reactor.

The laser maintaining and repairing apparatus according to the present invention fastens the vertical wheel and the horizontal wheel in contact with said shroud body upper edge are fastened to the end of said turning unit.

According to the laser maintaining and repairing apparatus, since the turning unit can be smoothly turned and driven by the vertical wheel and the horizontal wheel running at the shroud body upper edge, the maintenance and repairing operation in the nuclear reactor can be facilitated.

The laser maintaining and repairing apparatus according to the present invention provides the remote driver having horizontally turning, horizontally extending and vertically elevating mechanism on an upper core plate of a shroud body upper portion in said nuclear reactor pressure vessel, and said laser emitting unit is provided at said remove driver.

According to the present invention, there is an operating range which can cover the entire area of the shroud body inner wall by the remote driver having the three degrees of freedoms of horizontally turning, horizontally extending and vertically elevating, the emitting head can be easily moved to the surface to be processed in the nuclear reactor pressure vessel, thereby continuously efficiently executing the series of maintaining and repairing operations such as inspection and repair.

Further, the emitting head is inserted from another lattice hole from the lattice hole of the upper core plate installed with the remote driver, and the dimensional restriction (reactor core supporting plate passing condition) of the emitting head and the remote driver can be alleviated, thereby conducting the operation in the shroud of the lower portion from the reactor core supporting plate.

The laser maintaining and repairing apparatus according to the present invention provides the bearing and the O-ring provided on the outer surface of said beam guiding member, the rotation driving motor, and the gear provided on the outer surface of said beam guiding member engaged with a gear mounted at the rotary shaft of the motor, and the one beam guiding member and the other member are rotatably mounted and can be relatively rotated by the motor (actuator). The one member and the other member are stretchably mounted, and can be relatively stretchably provided by the extending or contracting mechanism. The beam guiding member is liquid-tight, and simultaneously rotatably mounted, and hence the beam guiding member can be rotated while maintaining liquid-tightly, and further the stretchably mounted beam guiding member can be extended or contracted while holding liquid-tightly with one another.

The laser maintaining and repairing apparatus according to the present invention provides the mechanism for rotatably aligning around axes perpendicular to one another by first and second motors is provided at a reflecting member in said beam guiding member.

According to the present invention, the angle of the reflecting member can be altered while centering the reflecting member by the first and second motors. Accordingly, even if a positional deviation occurs due to the deflection of the beam guiding member, it can be aligned remotely, and the execution can be finished in a short time without interrupting the operation.

In the laser maintaining and repairing apparatus according to the present invention, said emitting head includes an optical window for forming an element for sealing said beam guiding means at the end of the optical guide passage of said beam guiding means and transmitting the laser beam, a converging member disposed at the inside of the beam guiding means or at the outside of said optical window of the beam guiding means for converging the laser beam, and a reflecting mirror for reflecting the laser beam converged by said converging member to emit the beam to a portion to be processed, and said reflecting mirror includes a transparent member, and a reflecting layer provided on the back surface of said transparent member and made of vacuum or predetermined fluid, and the laser beam is reflected by the total reflection of the boundary between said transparent member back surface and said reflecting layer.

According to the present invention, the optical window is disposed near the converging member as the sealing member of the beam guiding member to increase the emitting area of the laser beam to the optical window. Therefore, the energy density of the laser beam for the optical window is reduced, and the energy of the laser beam which can be transferred by the beam guiding means is increased that much.

The reflecting mirror according to the present invention includes the reflecting layer made of vacuum or predetermined fluid on the back surface of the mirror to reflect the laser beam by the total reflection of the boundary between the mirror back surface and the reflecting layer, and hence the limit in the optical strength of the reflecting film on the reflecting mirror surface is eliminated, thereby enabling to use the laser of the high energy density.

The laser maintaining and repairing apparatus according to the present invention, since the converging member becomes also the sealing element of the beam guiding member, the optical window can be eliminated. That is, the structure can be simplified, and the limit due to the optical strength of the optical window can be completely excluded.

The laser maintaining and repairing apparatus according to the present invention, since the liquid jet nozzle for removing laser beam scatter causing substance is provided at the emitting head, bubble or dust generated from the portion to be processed can be removed, and the laser beam can be efficiently emitted to the portion to be processed.

The laser maintaining and repairing apparatus according to the present invention, since the liquid jet nozzle for forming a liquid layer on the surface i provided at the emitting head, similar process can be executed even in the air or liquid.

The laser maintaining and repairing apparatus according to the present invention, the end of the beam guiding means is integrated cylindrically with the emitting head, and the end of the beam guiding means and the emitting head can be processed while rotating in the circumferentially or moving in the axial direction, and particularly the inner surface of the cylindrical workpiece can be easily processed.

The laser maintaining and repairing apparatus according to the present invention, the reflecting mirror includes the mechanism for rotatably aligning around axes perpendicular to one another by the first and second motors, and hence the incident angle of the laser beam to the reflecting mirror is driven in the larger angle range than the critical angle of the total reflection, and the laser beam can be reflected in an arbitrary direction to be processed. Thus, the portion to be processed of the wide range can be continuously processed without moving the emitting head.

The laser maintaining and repairing apparatus according to the present invention, said beam guiding means is made of an optical fiber, and said emitting head is supported by a supporting driver having at least one of mechanisms for imparting horizontally turning, horizontally extending or contracting, vertically turning and extending or contracting operations, even the optical guide passage of a complicated shape which cannot be directly observed through can easily transmit the laser beam to the portion to be processed.

It is thought that the present invention will be understood from the foregoing description and it will be apparent that various changes may be made in the form, construction and arrangement there of may be made in the form, construction and arrangement thereof without departing from the spirit and scope of the present invention or sacrificing all of its material advantages, the form hereinbefore described being merely preferred or exemplary embodiments thereof.

What is claimed is:

1. A laser maintaining and repairing apparatus comprising:
   a laser oscillator;
   beam guiding means connected to the laser oscillator to guide a laser beam; and
   an emitting head for converging the laser beam from the beam guiding means and emitting the laser beam to a portion to be processed,
   wherein said beam guiding means includes a liquid-tight tubular beam guiding member,
   a reflecting member is provided in the beam guiding member, and
   said beam guiding member includes controllable mechanisms for imparting turning, extending or contracting operations.

2. The laser maintaining and repairing apparatus according to claim 1, wherein a mechanism for rotatably aligning around axes perpendicular to one another using first and second motors is provided at a reflecting member in said beam guiding member.

3. The laser maintaining and repairing apparatus according to claim 1, wherein said rotating mechanism for imparting said turning operation, includes,
   a bearing and an O-ring provided on the outer surface of said beam guiding member,
   a rotation driving motor, and
   a gear provided on the outer surface of said beam guiding member engaged with a gear mounted at a rotary shaft of the motor.

4. A laser maintaining and repairing apparatus comprising:
   a laser power source installed outside of a nuclear reactor pressure vessel, and
   a laser emitting unit installed in the nuclear reactor pressure vessel connected to the laser power source,
   wherein said laser emitting unit, includes,
   a laser oscillator connected to said laser power source,
   a liquid-tight vessel containing the laser oscillator and having a laser transmission window,
   beam guiding means connected to the laser transmission window of said liquid-tight vessel, and
   an emitting head for converging the laser beam from said beam guiding mean and emitting the laser beam to a portion to be processed, and
   said beam guiding means includes a plurality of tubular beam guiding means of a liquid-tight structure connected in tandem with said liquid-tight vessel,
   reflecting members are provided in said beam guiding means, and
   said beam guiding member includes at least one of mechanisms for imparting horizontally turning, horizontally extending or contracting, vertically turning, and vertically extending, or contracting operations.

5. The laser maintaining and repairing apparatus according to claim 4, wherein a center post is provided on an upper core plate of an upper portion of a shroud body in the nuclear reactor pressure vessel,
   a turning unit is horizontally rotatably provided at the center post,
   a moving carriage is horizontally movably provided at the turning unit, and
   said laser emitting unit is provided on the moving carriage.

6. The laser maintaining and repairing apparatus according to claim 5, wherein a vertical wheel and a horizontal wheel in contact with said shroud body upper edge portion are fastened to an end of said turning unit.

7. The laser maintaining and repairing apparatus according to claim 4, wherein a remote driver having horizontally turning, horizontally extending and vertically elevating mechanism is provided on an upper core plate of a shroud body upper portion in said nuclear reactor pressure vessel, and
   said laser emitting unit is provided at said remove driver.

8. The laser maintaining and repairing apparatus according to any of claims 4 to 7, wherein said rotating mechanism for imparting said turning operation, includes,
   a bearing and an O-ring provided on the outer surface of said beam guiding member,
   a rotation driving motor, and
   a gear provided on the outer surface of said beam guiding member engaged with a gear mounted at a rotary shaft of the motor.

9. The laser maintaining and repairing apparatus according to claim 4, wherein a mechanism for rotatably aligning around axes perpendicular to one another by first and second motors is provided at a reflecting member in said beam guiding member.

10. A laser maintaining and repairing apparatus comprising:

a laser oscillator, beam guiding means connected to the laser oscillator to guide a laser beam generated by the laser oscillator, and an emitting head for converging the laser beam from the beam guiding means and emitting the laser beam to a portion to be processed, wherein said emitting head, includes, an optical window provided at an end of an optical guide passage of said beam guiding means forming an element for sealing said beam guiding means and transmitting the laser beam, a converging member disposed inside the beam guiding means or outside the beam guiding means of said optical window for converging the laser beam, and a reflecting mirror for reflecting the laser beam converged by said converging member to emit the beam to a portion to be processed, and said reflecting mirror, includes, a transparent member, and a reflecting layer provided on a back surface of said transparent member and made of a vacuum or a predetermined fluid, and the laser beam is reflected by a total reflection of a boundary between said transparent member back surface and said reflecting layer.

11. The laser maintaining and repairing apparatus according to claim 10, wherein said beam guiding means is made of an optical fiber, and said emitting head is supported by a supporting driver having at least one of mechanisms for imparting horizontally turning, horizontally extending or contracting, vertically turning and extending or contracting operations.

12. The laser maintaining and repairing apparatus according to claim 10, wherein said emitting head is formed integrally cylindrical with an end of said beam guiding means, and said beam guiding means includes a mechanism for imparting rotation in a circumferential direction and imparting an extending or contracting operation in an axial direction, and is formed to enable processing of an inner surface of a cylindrical workpiece.

13. The laser maintaining and repairing apparatus according to claim 10, wherein the reflecting mirror of said emitting head includes a mechanism for rotatably aligning around axes perpendicular to one another using first and second motors.

14. A laser maintaining and repairing apparatus comprising:

a laser oscillator, beam guiding means connected to the laser oscillator to guide a laser beam generated by the laser oscillator, and an emitting head for converging the laser beam from the beam guiding means and emitting the laser beam to a portion to be processed, wherein said emitting head, includes, a converging member provided at an end of an optical guide passage of said beam guiding means forming an element for sealing said beam guiding means and converging the laser beam, and a reflecting mirror for reflecting the laser beam converged by said converging member and emitting the beam to a portion to be processed, and said reflecting mirror, includes, a transparent member, and a reflecting layer provided on a back surface of said transparent member and made of a vacuum or a predetermined fluid, and the laser beam is reflected by a total reflection of a boundary between said transparent member back surface and said reflecting layer.

15. The laser maintaining and repairing apparatus according to any of claims 10 and 14, wherein said emitting head includes a liquid jet nozzle for removing laser beam scattering substances of the portion to be processed.

16. The laser maintaining and repairing apparatus according to any of claims 10 and 14, wherein said emitting head includes a liquid jet nozzle for forming a liquid layer on a surface of the portion to be processed where the laser beam is emitted.

17. The laser maintaining and repairing apparatus according to claim 14, wherein the reflecting mirror of said emitting head includes a mechanism for rotatably aligning around axes perpendicular to one another using first and second motors.

18. The laser maintaining and repairing apparatus according to claim 14, wherein said beam guiding means is made of an optical fiber, and said emitting head is supported by a supporting driver having at least one of mechanisms for imparting horizontally turning, horizontally extending or contracting, vertically turning and extending or contracting operations.

19. The laser maintaining and repairing apparatus according to claim 4, wherein said emitting head is formed integrally cylindrical with an end of said beam guiding means, and said beam guiding means includes a mechanism for imparting rotation in a circumferential direction and imparting an extending or contracting operation in an axial direction, and is formed to enable processing of an inner surface of a cylindrical workpiece.

* * * * *